United States Patent
Schroeder et al.

(10) Patent No.: US 9,103,445 B2
(45) Date of Patent: Aug. 11, 2015

(54) ROTARY SEAL WITH TRUNCATED WAVE FORM

(75) Inventors: John Erick Schroeder, Houston, TX (US); Lannie Laroy Dietle, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 19 days.

(21) Appl. No.: 12/756,889

(22) Filed: Apr. 8, 2010

(65) Prior Publication Data
US 2010/0264603 A1   Oct. 21, 2010

Related U.S. Application Data

(60) Provisional application No. 61/212,179, filed on Apr. 8, 2009.

(51) Int. Cl.
*F16J 15/32* (2006.01)
*F16J 15/16* (2006.01)

(52) U.S. Cl.
CPC ............ *F16J 15/3244* (2013.01); *F16J 15/164* (2013.01)

(58) Field of Classification Search
CPC .................................................. F16J 15/3244
USPC ........................................................ 277/559
See application file for complete search history.

(56) References Cited

U.S. PATENT DOCUMENTS

| 4,610,319 | A | 9/1986 | Kalsi |
|---|---|---|---|
| 5,195,754 | A | 3/1993 | Dietle |
| 5,230,520 | A | 7/1993 | Dietle et al. |
| 5,678,829 | A | 10/1997 | Kalsi et al. |
| 5,738,358 | A | 4/1998 | Kalsi et al. |
| 5,823,541 | A | 10/1998 | Dietle et al. |
| 5,873,576 | A | 2/1999 | Dietle et al. |
| 6,007,105 | A | 12/1999 | Dietle et al. |
| 6,036,192 | A | 3/2000 | Dietle et al. |
| 6,109,618 | A | 8/2000 | Dietle |
| 6,120,036 | A | 9/2000 | Kalsi et al. |
| 6,227,547 | B1 | 5/2001 | Dietle et al. |
| 6,315,302 | B1 | 11/2001 | Conroy et al. |
| 6,334,619 | B1 | 1/2002 | Dietle et al. |

(Continued)

FOREIGN PATENT DOCUMENTS

| CA | 2601282 | 2/2010 |
|---|---|---|
| WO | 8503990 | 9/1985 |

OTHER PUBLICATIONS

International Search Report of corresponding application No. PCT/US2010/030424 dated May 21, 2010.

*Primary Examiner* — Vishal Patel
(74) *Attorney, Agent, or Firm* — Douglas W. Rommelmann; Andrews Kurth LLP

(57) ABSTRACT

The present invention is a generally circular rotary seal that establishes sealing between relatively rotatable machine components for lubricant retention and environmental exclusion, and incorporates seal geometry that interacts with the lubricant during relative rotation to distribute a lubricant film within the dynamic sealing interface. A preferably curved elevated contact pressure zone serves to maximize interfacial lubrication in critical areas during severe operating conditions by utilizing lubricant that would otherwise escape at the trailing edge of the hydrodynamic waves. The zones are produced by geometry that serves to minimize lubricant shear area, seal torque, seal volume, and wear, while ensuring retrofitability into the seal grooves of existing equipment.

105 Claims, 11 Drawing Sheets

(56) References Cited

U.S. PATENT DOCUMENTS

| | | | |
|---|---|---|---|
| 6,382,634 B1 | 5/2002 | Dietle et al. | |
| 6,494,462 B2 * | 12/2002 | Dietle | 277/549 |
| 6,561,520 B2 * | 5/2003 | Kalsi et al. | 277/559 |
| 6,685,194 B2 | 2/2004 | Dietle et al. | |
| 6,767,016 B2 | 7/2004 | Gobeli et al. | |
| 7,052,020 B2 | 5/2006 | Gobeli et al. | |
| 7,562,878 B2 * | 7/2009 | Dietle et al. | 277/559 |
| 2002/0163138 A1 * | 11/2002 | Dietle | 277/559 |
| 2005/0093246 A1 | 5/2005 | Dietle et al. | |
| 2006/0214379 A1 | 9/2006 | James et al. | |
| 2006/0214380 A1 * | 9/2006 | Dietle et al. | 277/559 |
| 2007/0013143 A1 | 1/2007 | Schroeder et al. | |
| 2007/0205563 A1 | 9/2007 | Dietle et al. | |
| 2009/0001671 A1 | 1/2009 | Dietle et al. | |
| 2009/0250881 A1 | 10/2009 | Dietle et al. | |

* cited by examiner

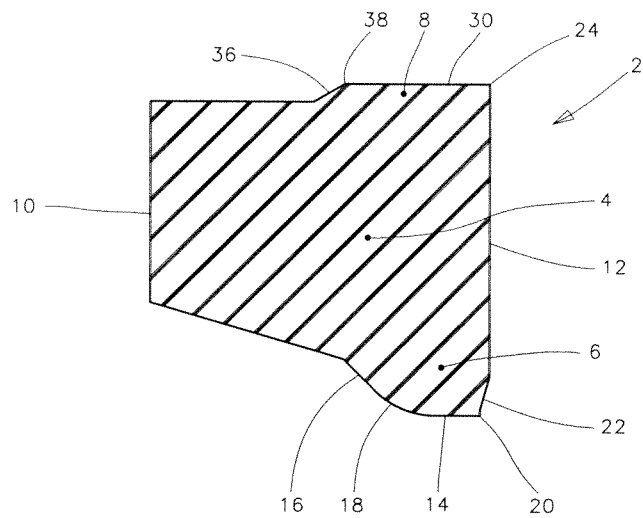
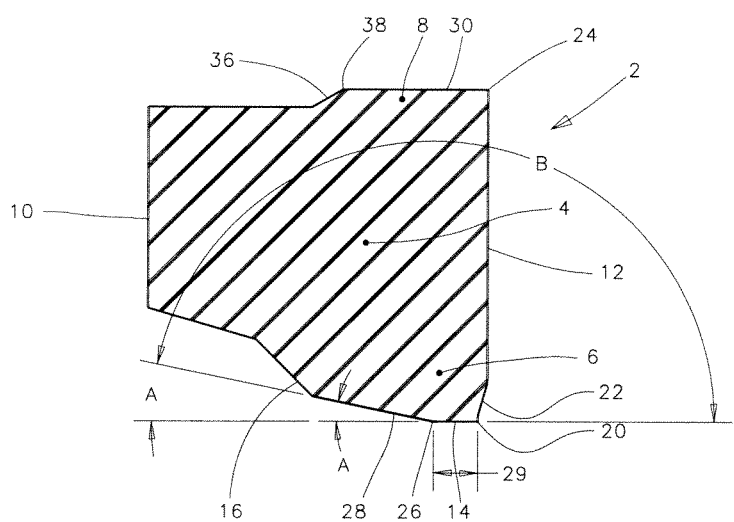

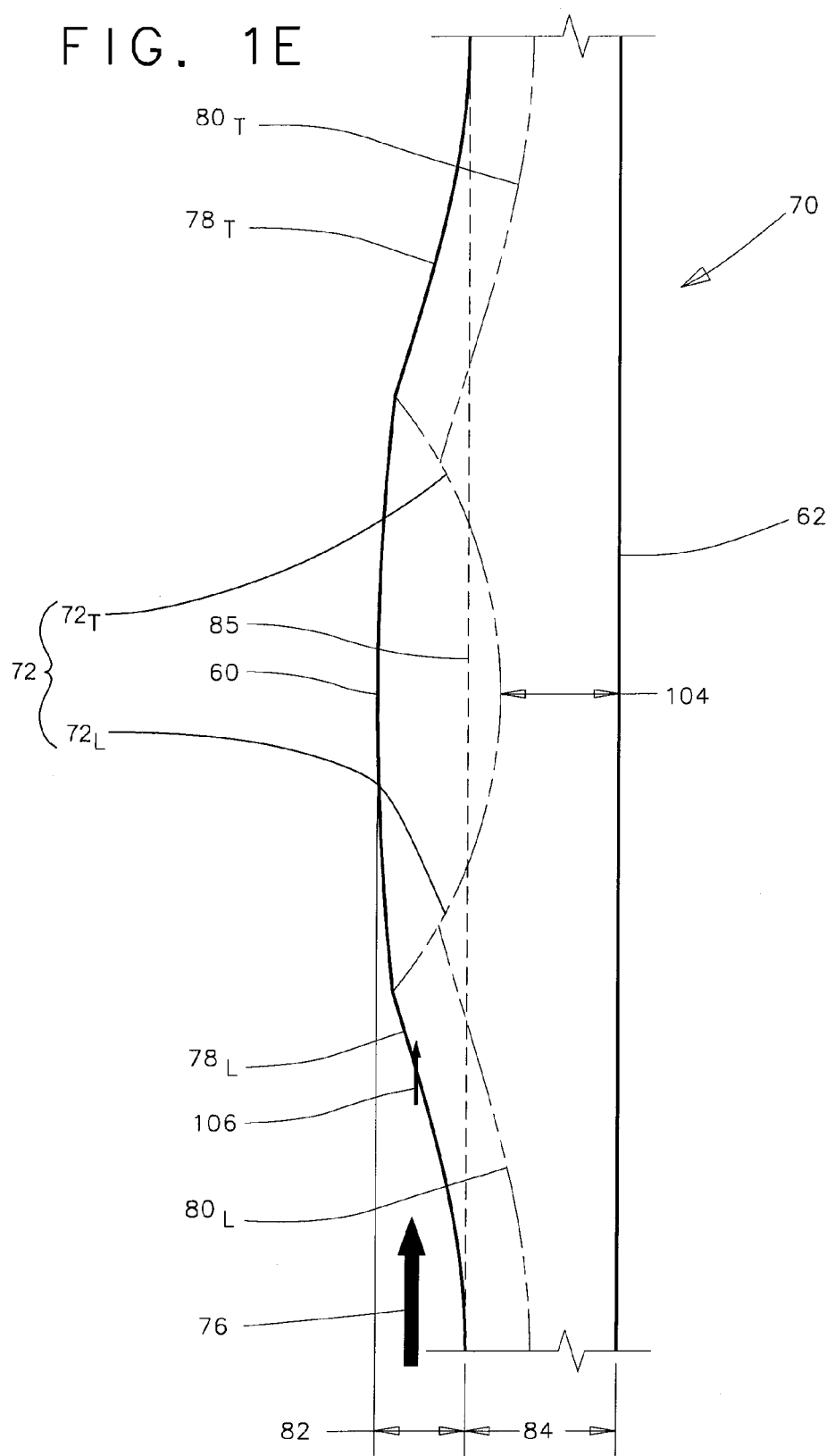

ROTARY SEAL WITH TRUNCATED WAVE FORM

CROSS-REFERENCE TO RELATED APPLICATIONS

This application claims the benefit of U.S. Provisional Application Ser. No. 61/212,179 filed Apr. 8, 2009, entitled "Rotary seal with improved environmental exclusion." Applicant incorporates by reference herein U.S. Provisional Application Ser. No. 61/212,179 in its entirety.

BACKGROUND OF THE INVENTION

1. Field of the Invention

This invention relates to hydrodynamic rotary seals for bi-directional or uni-directional rotation that are used to retain a lubricant and exclude an environment. More specifically, this invention relates to a feature that improves seal lubrication in adverse conditions such as high operating temperature, skew-resisting confinement, high differential pressure, high initial compression, adverse tolerance accumulation, circumferential compression, high modulus seal materials, dynamic runout, reversing differential pressure, thin viscosity lubricants, third body seal surface wear, and/or material swell (collectively referred to as "severe operating conditions").

2. Description of the Related Art

The following commonly assigned patent documents represent prior art that is related to the invention:

United States Patents:
U.S. Pat. No. 7,562,878 Low torque hydrodynamic lip geometry for bi-directional rotation seals;
U.S. Pat. No. 7,052,020 Hydrodynamic Rotary Seal;
U.S. Pat. No. 6,767,016 Hydrodynamic Rotary Seal With Opposed Tapering Seal Lips;
U.S. Pat. No. 6,685,194 Hydrodynamic Rotary Seal With Varying Slope;
U.S. Pat. No. 6,561,520 Hydrodynamic Rotary Coupling Seal;
U.S. Pat. No. 6,494,462 Rotary Seal With Improved Dynamic Interface;
U.S. Pat. No. 6,382,634 Hydrodynamic Seal With Improved Extrusion Abrasion and Twist Resistance;
U.S. Pat. No. 6,334,619 Hydrodynamic Packing Assembly;
U.S. Pat. No. 6,315,302 Skew Resisting Hydrodynamic Seal;
U.S. Pat. No. 6,227,547 High Pressure Rotary Shaft Sealing Mechanism;
U.S. Pat. No. 6,120,036 Extrusion Resistant Hydrodynamically Lubricated Rotary Shaft Seal;
U.S. Pat. No. 6,109,618 Rotary Seal With Enhanced Lubrication and Contaminant Flushing;
U.S. Pat. No. 6,036,192 Skew and Twist Resistant Hydrodynamic Rotary Shaft Seal;
U.S. Pat. No. 6,007,105 Swivel Seal Assembly;
U.S. Pat. No. 5,873,576 Skew and Twist Resistant Hydrodynamic Rotary Shaft Seal;
U.S. Pat. No. 5,823,541 Rod Seal Cartridge for Progressing Cavity Artificial Lift Pumps;
U.S. Pat. No. 5,738,358 Extrusion Resistant Hydrodynamically Lubricated Multiple Modulus Rotary Shaft Seal;
U.S. Pat. No. 5,678,829 Hydrodynamically Lubricated Rotary Shaft Seal With Environmental Side Groove;
U.S. Pat. No. 5,230,520 Hydrodynamically Lubricated Rotary Shaft Seal Having Twist Resistant Geometry;
U.S. Pat. No. 5,195,754 Laterally Translating Seal Carrier For a Drilling Mud Motor Sealed Bearing Assembly;
U.S. Pat. No. 4,610,319 Hydrodynamic Lubricant Seal For Drill Bits;

United States Patent Applications:
Pub. No. 2005/0093246 Rotary Shaft Sealing Assembly;
Pub. No. 2006/0214379 Composite, High Temperature, Dynamic Seal and Method of Making Same;
Pub. No. 2009/0250881 Low Torque Hydrodynamic Lip Geometry for Bi-Directional Rotation Seals;
Pub. No. 2007/0013143 Filled Hydrodynamic Seal With Contact Pressure Control, Anti-Rotation Means and Filler Retention Means;
Pub. No. 2007/0205563 Stabilizing Geometry for Hydrodynamic Rotary Seals; and
Pub. No. 2009/0001671 Rotary Seal with Improved Film Distribution.

Assignee Kalsi Engineering manufactures various configurations of hydrodynamic rotary seals, based on the above-referenced patents and patent applications, and sells them under the registered trademark "KALSI SEALS." The rotary seals that are marketed by Kalsi Engineering are typically installed with radial interference (i.e., compression), and seal by blocking the leak path. Such seals are being challenged to operate at ever-greater temperatures and differential pressures. For general examples of such seals, see FIG. 3 of U.S. Pat. No. 5,230,520, FIG. 4 of U.S. Pat. No. 6,315,302, and FIG. 6 of U.S. Pat. No. 6,382,634.

Upon installation in a compressed condition, hydrodynamic seals define an "interfacial contact footprint" (sometimes just called the "footprint") that represents the shape of the "dynamic sealing interface," and the terms are generally interchangeable. Examples of footprints are shown in FIG. 2 of assignee's U.S. Pat. No. 4,610,319 and FIG. 13 of assignee's U.S. Pat. No. 5,230,520. The seals employ various variable width dynamic lip geometries that cause a lubricant-side edge of a dynamic sealing interfacial contact footprint to be wavy. The environment side of the interfacial contact footprint is intended to be substantially circular, to avoid hydrodynamic activity with the environment, and thereby exclude the environment.

As a consequence of the wavy lubricant-side footprint edge, the rotary motion of the lubricant-wetted shaft drags lubricant into the dynamic sealing interface. This hydrodynamic operating regime is intended to allow the seal to operate cooler and with less wear. Although a good level of lubrication is achieved in many cases, in some cases certain designs fall short when exposed to severe operating conditions.

Smaller seal cross-sections are desirable because shaft and housing wall thickness can be maximized. Miniaturization impacts seal lubrication, as described in U.S. Pat. Appl. Pub. 2007/0205563, paragraphs [0036]-[0039]. For a given dimensional compression, interfacial contact pressure increases as a seal cross-section is miniaturized. With radial seals, circumferential compression increases as diameter is miniaturized, increasing footprint spread and contact pressure.

The skew-induced wear mechanism described and illustrated in FIG. 3-27 of the Kalsi Seals Handbook, Rev. 1 is addressed with skew-resisting confinement of the seal, which increases interfacial contact pressure and footprint spread. The term "skew-resisting confinement," as used herein, encompasses (1) constraint imposed by seal contact with fixed location gland walls as disclosed in U.S. Pat. No. 6,315,302, and (2) spring-loading through a moveable gland wall, as disclosed in U.S. Pat. App. Pub. No. 2009/0001671.

U.S. Pat. No. 6,109,618 teaches the use of abrupt, skewed trailing edge geometries, that are unsuitable as hydrodynamic inlets, on seals suitable only for uni-directional rotation. This abrupt geometry is on the trailing edges of the waves, and is coupled with a very gently converging inlet geometry on the leading edges. Due to the high hydrodynamic leakage of such geometry, and the small reservoir size of downhole tools, such seals cannot be used in downhole oil well applications.

The prior art seals are constructed from elastomers that suffer accelerated degradation at elevated temperature. For example, media resistance problems, gas permeation, swelling, compression set, and pressure related extrusion damage all become worse at elevated temperature. A bi-directional rotation seal that operates with less torque and produces less seal-generated heat would be desirable, in order to moderate such degradation.

U.S. Pat. App. Pub. No. 2009/0001671, "Rotary Seal with Improved Film Distribution" teaches that in the prior art, interfacial lubrication is impaired when the size of a dimensional variable changes due to the effects of certain severe operating conditions. That patent application teaches a lubrication enhancement solution that involves adding more elastomer volume to the seal. This solution is less than perfect in a seal that is axially constrained in accordance with the teachings of U.S. Pat. No. 6,315,302, "Skew Resisting Hydrodynamic Seal," because the increased seal volume is difficult to accommodate from geometric and interfacial contact pressure standpoints due to the need to accommodate differential thermal expansion between the seal and the hardware it is mounted in. Secondly, the exclusion edge issue disclosed in U.S. Pat. App. Pub. No. 2007/0205563, "Stabilizing Geometry for Hydrodynamic Rotary Seals," is exacerbated by certain aspects of the U.S. Pat. App. Pub. No. 2009/0001671 solution.

FIG. 1 of U.S. Pat. App. Pub. No. 2009/0001671 is a graph that schematically represents an interfacial contact pressure plot at any circumferential location of a typical seal manufactured according to one of assignee's U.S. Pat. Nos. 4,610,319, 5,230,520, 6,315,302, 6,382,634, and so forth. In that patent application, the labels and dimensions (i.e., first footprint edge L, second footprint edge E, Location P, Dimension A, Dimension B and Width W) are, when necessary, given a subscript "1" or "2" to refer to specific locations of the interfacial contact footprint, width-wise. The portion of the footprint that is circumferentially aligned with Dimension $A_2$ contributes little to overall interfacial lubrication because of lubricant loss at the trailing edge of the wave.

Dimension $A_2$ is related to the size and the shape of the hydrodynamic inlet, and contact pressure at Location $P_2$ is also related to the size and the shape of the hydrodynamic inlet. This precludes independent manipulation of the size of Dimension $A_2$ and the contact pressure at Location $P_2$, and means that the size of Dimension $A_2$ is undesirably large, especially in high temperature operation and/or operation with skew-resisting confinement.

The term "un-swept zone" refers to that portion of the footprint that is circumferentially aligned with Width $W_1$, and the tell "swept zone" refers to the remainder of the footprint. In other words the swept zone is that portion of the footprint that is circumferentially aligned with the footprint wave height. The swept zone is directly lubricated by the sweep of the First Footprint Edge L across the lubricant-wetted shaft. It is a significant undesirable characteristic of the prior art bi-directional rotation seals that lubrication of the un-swept zone is impaired in severe operating conditions.

Elastomers have a high coefficient of thermal expansion. Because there is more material at the widest parts of the dynamic lip, part of the differential thermal expansion between the seal and the housing is relieved circumferentially, causing material displacement from the widest to the narrowest parts of the dynamic lip, and reducing the width of the swept zone while increasing the sizes of Dimension $A_1$ and $A_2$, Dimension $B_1$ and $B_2$, and Width $W_1$ and $W_2$. This effect is exacerbated by skew-resisting confinement.

As the aforementioned sizes increase and the size of the swept zone decreases, lubrication is impaired, causing the seal to generate more and more heat due to increasing asperity friction, and causing a loss of lubricant film viscosity. These factors further increase seal temperature, compounding the problem and leading to an unsustainable runaway operating condition.

Initial compression also causes circumferential compression, which is increased by thermal expansion. Since the seal circumference is relatively long compared to the seal cross-section, circumferential compression can cause buckling in a manner similar to the classic textbook example of a long, slender structural column under compressive loading. This buckling tendency is augmented by the variable stiffness of the prior art seal about its circumference that is caused by the varying dynamic lip width and volume. A seal that has less lip size variation around its circumference would be more desirable than a seal that has more variation, assuming adequate lubrication. Lubricant passing through the region between first footprint edge $L_2$ and Location $P_2$ does little to benefit overall lubrication, because the lubricant film exits at the trailing edge of the wave. Dimension $A_2$ increases significantly when a seal is used in skew-resisting confinement because the footprint spreads as more of the hydrodynamic inlet is brought into contact with the shaft due to seal thermal expansion.

It is desirable to be able to overcome the shortcomings described above. A sealing arrangement that provides a better way to enhance interfacial lubrication would be an advantage in many applications where long sealing life is needed to protect critical components in severe operating conditions.

SUMMARY OF THE INVENTION

The present invention relates to generally circular rotary seals that are suitable for both clockwise and counter-clockwise rotation, and overcome the aforementioned prior art problems. In other words they are bi-directional rotation seals. Preferably, the seals are used to establish sealing between a machine component (such as a housing) and a relatively rotatable surface (such as a shaft), in order to separate a lubricating media from an environment. Preferably, the machine component holds the seal in compressed relation with the relatively rotatable surface.

Seal geometry on a dynamic lip interacts with the lubricating media during relative rotation to wedge a lubricating film into the dynamic sealing interface between the seal and the relatively rotatable surface. Lubricating film migrates toward, and into the environment and thus provides a contaminant flushing action.

The rotary seal includes a dynamic lip having local variations in width. The dynamic lip defines a hydrodynamic wedging angle with respect to a relatively rotatable surface (such as the surface of a shaft), and defines an interfacial contact footprint of generally circular configuration but varying in width, and establishes interfacial contact pressure within the footprint. The interfacial contact pressure establishes sealing in the same manner as any conventional resilient seal, such as an O-ring or a seal having a lip that is loaded by an energizer. The interfacial contact pressure is related to factors such as the degree of compression, the modulus of elasticity of the seal material, the shape of the seal, and the magnitude of differential pressure acting across the seal.

An important aspect of a preferred embodiment of the present invention involves the incorporation of a bi-directional diverter on the dynamic lip which moves additional lubricant into critical areas of the sealing interface. The bi-directional diverter feature is preferably implemented in a way that also helps to minimize seal volume for improved compatibility with skew-resisting confinement. The diverter geometry preferably intersects both the traditional dynamic sealing surface and the traditional hydrodynamic inlet, and may also intersect the lubricant-side flank of the dynamic lip. The diverter can be incorporated by faceting or scalloping the wave to give it a truncated appearance.

The seal preferably provides a dynamic exclusionary intersection of abrupt substantially circular form that provides the interfacial contact footprint with an environment edge that resists environmental intrusion. The seal can be configured for dynamic sealing against a shaft, a bore, or a face. Simplified embodiments are possible wherein one or more features of the preferred embodiment are omitted.

It is intended that the rotary seals of the present invention may incorporate one or more sealing materials without departing from the spirit or scope of the invention, and may be composed of any suitable sealing material, including elastomeric or rubber-like materials which may if desired be combined with various plastic materials such as reinforced polytetrafluoroethylene ("PTFE") based plastic. If desired, the rotary seals may be of monolithic integral, one piece construction, or may also incorporate different materials bonded, inter-fitted, co-vulcanised, or otherwise joined together to form a composite structure such as shown in U.S. Pat. Nos. 5,738,358, 6,315,302, 6,685,194, 6,767,016 and U.S. Pat. Appl. Publication Nos. 2006/0214379 and 2006/0214380. Preferably, at least part of the seal is constructed of a resilient material, such as an elastomer.

If desired, the rotary seal can be held in skew-resisting confinement by virtue of simultaneously contacting both walls of the groove in which it is mounted. If desired, one groove wall can be the face of a spring-loaded seal loading ring of the general type taught by FIG. 3-28 of the Kalsi Seals Handbook, Rev. 1.

One objective of the preferred embodiment of the present invention is to provide a hydrodynamic rotary seal having low torque for reduced wear and heat generation. Another objective is improved distribution of lubricant across the dynamic sealing interface, and correspondingly reduced seal wear, particularly in seals that are exposed to skew-resisting axial confinement and/or high differential pressure acting from the lubricant side of the seal. Another objective is to better accommodate high temperature operation in conditions of skew-resisting axial confinement by minimizing local seal volume and by providing geometry that is more immune to thermal expansion-related problems.

BRIEF DESCRIPTION OF THE SEVERAL VIEWS OF THE DRAWINGS

So that the manner in which the above recited features, advantages, and objects of the present invention are attained and can be understood in detail, a more particular description of the invention, briefly summarized above, may be had by reference to the embodiments thereof that are illustrated in the appended drawings. It is to be noted, however, that the appended drawings only illustrate preferred embodiments of this invention, and are therefore not to be considered limiting of its scope, for the invention may admit to other equally effective embodiments that vary only in detail.

In the drawings:

FIGS. 1B and 1C are fragmentary cross-sectional views representing a cross-sectional configuration of the ring-shaped hydrodynamic seal of FIG. 1A at two different locations, FIG. 1B is a view taken at the narrowest part of the dynamic sealing lip and FIG. 1C is a view taken at the widest part of the dynamic sealing lip;

FIG. 1E is a fragmentary view of an interfacial contact footprint of a complete wave of the dynamic lip of the seal of FIG. 1A, the view showing swept and un-swept zones and pressure ridges within the footprint;

DESCRIPTION OF THE PREFERRED EMBODIMENTS

Figure 1A:
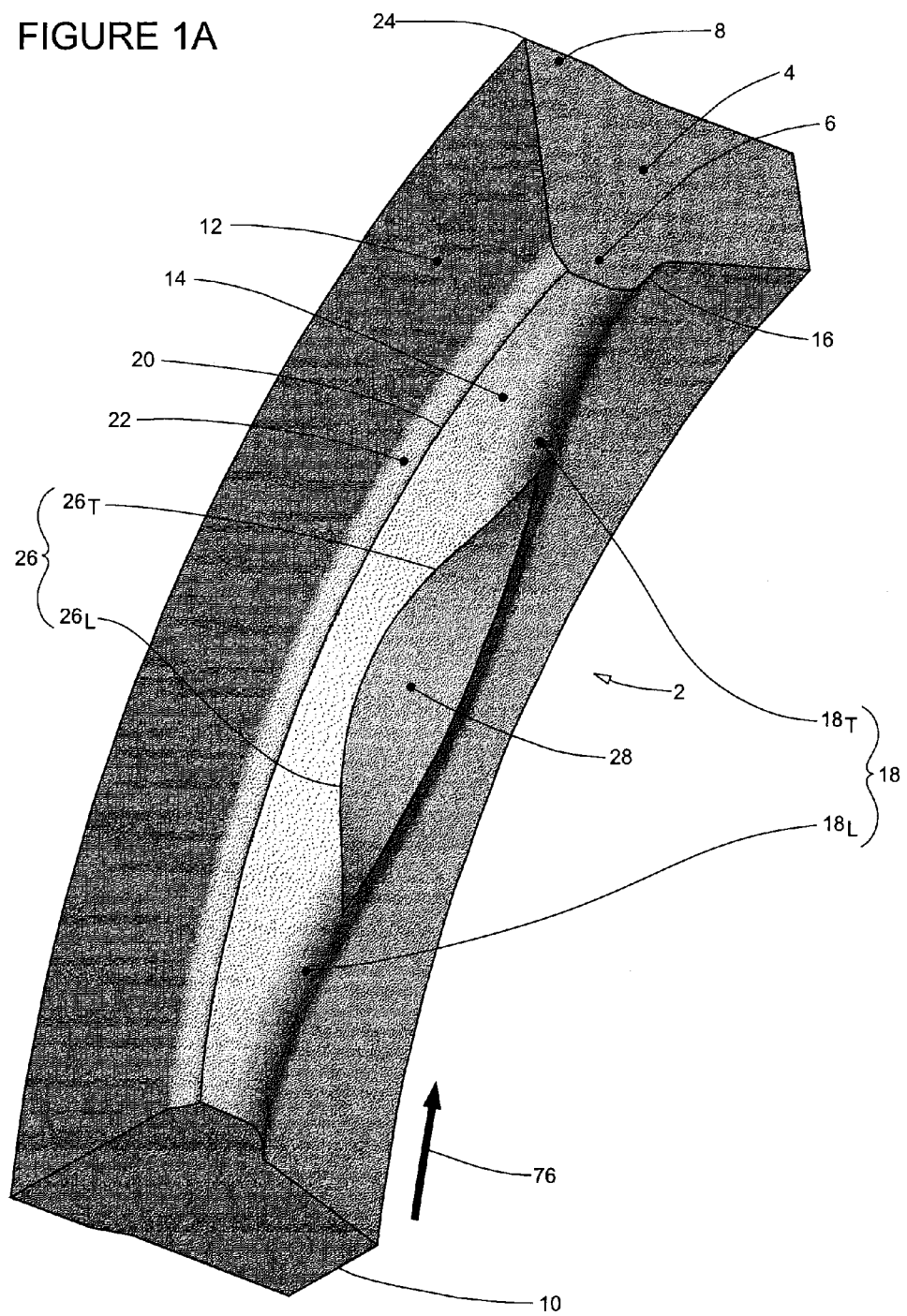
FIG. 1A is an enlarged fragmentary shaded perspective view of a ring-shaped hydrodynamic seal having a dynamic sealing lip according to a preferred embodiment of the present invention, the seal being shown in an uncompressed and uninstalled condition.

Features throughout this specification that are represented by like numbers have the same basic function. The ring-like rotary seal according to the preferred embodiments of the present invention is generally referred to as reference number 2 in the drawings.

FIGS. 1A-1E

FIGS. 1A to 1E represent a preferred embodiment of the present invention. These figures should be studied together to best understand the preferred embodiment.

FIG. 1A

FIG. 1A is a fragmentary shaded perspective view representing a ring-shaped rotary seal shown generally at 2 that represents a preferred embodiment of the present invention. The rotary seal 2 is shown in its uncompressed, uninstalled condition. For discussion purposes, a direction of relative rotation 76 is identified by an arrow, it being understood that rotation in some applications can reverse.

The rotary seal 2 has a ring-like seal body 4 of generally circular configuration. The term "ring-like" is used with the understanding that the term "ring" is commonly understood to encompass shapes other than those that are perfectly circular. As an example, a decorative finger ring often has beaded edges or a sculpted shape, yet is still called a ring. As another example, the key ring of U.S. Pat. No. 1,462,205 is not everywhere circular. There are thousands of precedents for using the term "ring-like" in a patent, and many patents use the term in conjunction with a seal or a body of a seal. For example, see U.S. Pat. Nos. 612,890, 4,361,332, 4,494,759, 4,610,319, 4,660,839, 4,909,520, 5,029,879, 5,230,520, 5,584,271, 5,678,829, 5,833,245, 5,873,576, 6,109,618, 6,120,036, and 7,562,878. Note that in many of the examples, the seal in question has features that result in the shape not being everywhere circular; for example in some cases the dynamic lip of the ring-like seal has a wavy lubricant-side shape.

The rotary seal 2 includes a dynamic sealing lip 6 of generally annular form that projects from the seal body 4. The rotary seal 2 preferably incorporates a static sealing lip 8 that projects from the seal body 4 in generally opposed relation to the dynamic sealing lip 6, to provide a degree of twist-inhibiting compressive symmetry, as taught by commonly assigned U.S. Pat. No. 5,230,520. As a simplification, the static sealing lip 8 can be eliminated.

As used herein, the "modulus" or "elastic modulus" of an elastomer can be estimated in accordance with FIG. 1 of ASTM D 1415-83, Standard Test Method for Rubber Property—International Hardness. Rotary Seal 2 is constructed of sealing material which is preferably an elastomer compound or a combination of one or more elastomer compounds, or a combination of a suitable plastic and an elastomer compound, as taught by the prior art. For example, the region of the seal comprising the dynamic sealing lip 6 could be made from a first material, and the region comprising the static sealing lip 8 could be made from a second material. As taught by commonly assigned U.S. Pat. No. 5,738,358, the first material could have a higher elastic modulus, compared to that of the second material. As taught by commonly assigned Canadian Pat. No. 2601282, the first material could be selected based on its dynamic running characteristics, and the second material could be selected based on its compression set resistance characteristics.

It is commonly understood by those having ordinary skill in the art that elastomers used in seal construction are compounds that include one or more base elastomers. Such base elastomers include, but not limited to, HNBR (hydrogenated nitrile elastomer, also known as HSN), FKM (fluorocarbon rubber), FEPM (also known as TFE/P or Tetrafluoroethylene and Propylene Copolymer), and EPDM. Such compounds may include other compounding agents including fillers, processing aids, anti-degradants, vulcanizing agents, accelerators and activators. The effects of the ingredients used are generally understood by those of ordinary skill in the art of compounding elastomers. Likewise, the ingredients used in manufacturing plastics that are used in seal construction are generally understood by those of ordinary skill in the art of developing plastic seal materials.

The seal body 4 preferably has a first body end 10 and a second body end 12. The seal body 4, being a generally circular, ring-like entity, defines a theoretical centerline/axis (not shown). The first body end 10 of rotary seal 2 is preferably located in generally opposed relation to the second body end 12. Within the seal industry, the first body end 10 is sometimes referred to as the "lubricant end," and the second body end 12 is sometimes referred to as the "environment end." This nomenclature was, for example, used in U.S. Pat. No. 5,738,358. If desired, portions of the first body end 10 can be angulated, as taught by U.S. Pat. Appl. Pub. No. 2007/0205563.

The dynamic sealing lip 6 incorporates a dynamic sealing surface 14. The cross-sectional profile of the dynamic sealing surface 14 can be any suitable shape, including straight or curved lines or line combinations, and including shapes that vary at different locations of the dynamic sealing lip 6. Many such shapes are taught by the prior art. The dynamic sealing lip 6 preferably has a lubricant side flank 16 that is non-circular; and preferably wavy. The lubricant side flank 16 can, if desired, vary in slope around the rotary seal 2, as taught by the prior art.

At least the narrower portions of dynamic sealing lip 6 incorporate a sloping inlet surface 18. At least part of the sloping inlet surface 18 is wavy, so that it is skewed with respect to the direction of relative rotation when assembled. Sloping inlet surface 18 can take any suitable form that is suitable for forming part of a hydrodynamic inlet when the dynamic sealing lip 6 is brought into contact with a relatively rotatable surface. The lubricant side flank 16 is preferably blended to the dynamic sealing surface 14 by the sloping inlet surface 18 over at least part of the circumference of seal body 4.

This sloping inlet surface 18 can take many different forms, including forms that vary in shape about the circumference of the seal body 4. The sloping inlet surface 18 is given many different names in the prior art, and many suitable shapes are taught by the prior art. For example, commonly assigned U.S. Pat. No. 6,685,194 says that this region can be "any type of curve, such as but not limited to a radius, a portion of an ellipse, a portion of a sine wave curve, a portion of a parabolic curve, a portion of a cycloid curve, a portion of witch/versiera curves, or combinations thereof, etc." As another example, commonly assigned U.S. Pat. No. 7,052,020 says this region can "consist of any type or combination of curve, such as a radius, and portions of curves such as ellipses, sine waves, parabolas, cycloid curves, etc."

The sloping inlet surface 18 and the lubricant side flank 16 establish gentle convergence along that portion of the leading edge of the footprint to establish an efficient hydrodynamic wedge at the portion of the leading edge that is circumferentially aligned with the swept zone, establishing a desirably gradual increase in interface contact pressure in the circumferential direction.

The dynamic sealing surface 14 of the dynamic sealing lip 6 preferably incorporates an exclusion edge 20 that preferably has generally abrupt form, and is preferably generally circular when the rotary seal 2 is installed. If desired, the exclusion edge 20 can be formed by an intersection between the dynamic sealing surface 14 and a flexible transitional heel 22, as taught by commonly assigned U.S. Pat. No. 5,738,358. If desired, the exclusion edge 20 can also be formed by an intersection between the dynamic sealing surface 14 and the second body end 12, as taught by assignee's U.S. Pat. Nos. 4,610,319 and 5,230,520. The flexible transitional heel 22 is often referred to as the "exclusion edge chamfer" within the industry. The lubricant side flank 16 is located in spaced relation with respect to the exclusion edge 20 and the second body end 12.

As a simplification, the flexible transitional heel 22 can be eliminated. In such cases, the exclusion edge 20 can be formed by an intersection between the dynamic sealing surface 14 and second body end 12, as taught by the prior art.

The sloping inlet surface 18 of the present invention is intentionally wavy, as originally taught by U.S. Pat. No. 4,610,319, forming a leading edge 18$_L$ and a trailing edge 18$_T$ of the sloping inlet surface, relative to the direction of relative rotation 76. When the direction of relative rotation reverses, the application of the "leading" and "trailing" appellations also reverses. As taught by other prior art, this desired waviness can be achieved with many different wave shapes. The static sealing lip 8 preferably incorporates a static exclusionary intersection 24, as taught by the prior art.

A unique feature of the preferred embodiment of the present invention is a ridge 26 that takes the form of an external corner. The ridge 26 interrupts the sloping inlet surface 18 and preferably also interrupts the dynamic sealing surface 14, and may also interrupt the lubricant side flank 16. The ridge 26 has a ridge leading edge 26$_L$ and a ridge trailing edge 26$_T$, relative to the direction of relative rotation 76. When the direction of relative rotation reverses, the application of the "leading" and "trailing" appellations also reverses.

The ridge 26 is preferably located adjacent to, and established in part by a ridge flank 28. The ridge 26 and the ridge flank 28 preferably truncate the sloping inlet surface 18 and preferably also truncate the dynamic sealing surface 14, and may also truncate the lubricant side flank 16. The words "truncate" and "truncated," when used herein means that it makes the feature in question "look as if a portion has been cut away." In other words, ridge 26 and the ridge flank 28 preferably make the sloping inlet surface 18 look as if a portion has been cut away, and preferably also make the dynamic sealing surface 14 look as if a portion has been cut away, and may also make the lubricant side flank 16 look as if a portion has been cut away. As shown by FIG. 1A, the truncation of the sloping inlet surface 18 by the ridge 26 and the ridge flank 28 make the dynamic sealing surface 14 look as if a portion has been cut away, and also results in the ridge 26 traversing along a portion of the inlet surface 18, locally forming an edge of both the ridge flank 28 and the sloping inlet surface 18.

Although illustrated as a sharp intersection (i.e., a sharp external corner), in a molded rubber product the ridge 26 will typically have a more rounded character. The geometry can be created by any suitable manufacturing method, such as by machining or molding processes, or a combination of molding and machining.

Preferably the ridge 26 is curved so that some of it is closer to the exclusion edge 20 and some of it is farther away. Useful alternate embodiments are possible where the diversionary ridge is not curved.

Preferably the abruptness of the ridge 26 decreases as the ridge 26 comes closer to the exclusion edge 20. The abruptness of the ridge 26 can be controlled by two factors. One controlling factor is the local slope of the ridge flank 28. The other controlling factor is local curvature that provides the ridge 26 with a rounded character.

Preferably, the ridge flank 28 truncates at least a portion of the sloping inlet surface 18 and preferably the ridge 26 traverses along at least a portion of the sloping inlet surface 18, establishing the edge/boundary of at least a portion of the sloping inlet surface 18. As shown by FIG. 1A, the ridge flank 28 may also truncate the dynamic sealing surface 14 and the ridge 26 can, if desired, establish an edge/boundary of the dynamic sealing surface 14. If desired, the ridge flank 28 can be configured so that it not only truncates the sloping inlet surface 18, but also bifurcates it. As shown by FIG. 1A, the sloping inlet surface 18 is bifurcated into first and second sloping inlet surfaces by the ridge flank 28.

In summary, the ridge 26 truncates the sloping inlet surface 18 of the dynamic sealing lip 6 and preferably truncates the dynamic sealing surface 14 and may truncate the lubricant side flank 16.

FIGS. 1B and 1C

FIGS. 1B and 1C are fragmentary longitudinal cross-sectional views that represent the same rotary seal 2 that is shown in FIG. 1A. As with FIG. 1A, FIGS. 1B and 1C represent the uncompressed condition of rotary seal 2. FIG. 1B corresponds to the narrowest part of the dynamic sealing lip 6, and FIG. 1C corresponds to the widest part of the dynamic sealing lip 6. In FIGS. 1B and 1C, it can be seen that the dynamic sealing lip 6 projects from the seal body 4. It can also be seen that the static sealing lip 8 projects from the seal body 4 in generally opposed relation to the dynamic sealing lip 6, and incorporates a static sealing surface 30.

The specific shape of the static sealing lip 8 can vary from the shape that is shown without departing from the spirit or scope of the invention. For example, the static sealing surface 30 could be slightly conical/sloped, as taught by commonly assigned U.S. Pat. No. 7,052,020. If desired, the embodiments illustrated herein can be simplified by eliminating the static sealing lip 8, such that the static sealing surface 30 is defined by the seal body, as taught by U.S. Pat. No. 4,610,319.

Seal body 4, dynamic sealing lip 6, static sealing lip 8, first body end 10, second body end 12, dynamic sealing surface 14, lubricant side flank 16, exclusion edge 20, and flexible transitional heel 22 are labeled for the purpose of orienting the reader. Sloping inlet surface 18 is shown in FIG. 1B as having a convex curved form and ridge flank 28 and ridge 26 are shown in FIG. 1C. As shown in FIG. 1C, the ridge flank 28 can have a straight profile when viewed in longitudinal cross-section.

In FIG. 1C, Angle A is the external angle between dynamic sealing surface 14 and ridge flank 28, and Angle B is the included angle between dynamic sealing surface 14 and ridge flank 28. In order to make the ridge 26 less abrupt as it comes closer to the exclusion edge 20, it is preferred that Angle A decrease as the ridge 26 comes closer to the exclusion edge 20, and that included Angle B increases as the ridge 26 comes closer to the exclusion edge 20. It is preferred that Angle B is an obtuse angle; i.e. it is preferred that Angle B is greater than 90 degrees.

As can be seen in FIG. 1C, the ridge 26, if rounded, preferably blends the intersection of dynamic sealing surface 14 and ridge flank 28. In order to make the ridge 26 less abrupt as it comes closer to the exclusion edge 20, it is preferred that the local curvature of the ridge 26 becomes larger (i.e., the rate of curvature decreases) as the ridge 26 comes closer to the exclusion edge 20.

The separating distance 29 between the ridge 26 and the exclusion edge 20 need not be the same on every wave of the seal. It can be advantageous to vary the size of separating distance 29 on some waves to distribute lubricant more effectively to locations within the seal footprint that require more lubricant film.

If desired, the dynamic sealing surface 14 can be of tapered configuration as taught by U.S. Pat. No. 6,767,016.

Figure 1D:
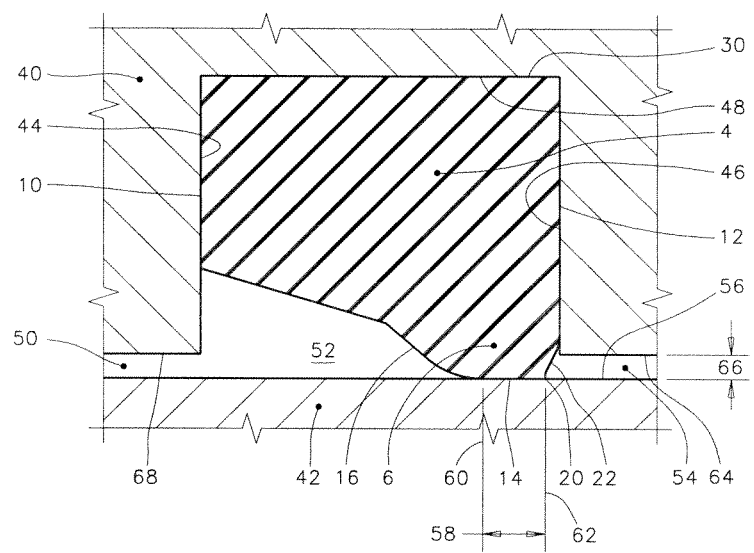
FIG. 1D is a fragmentary cross-sectional view of the hydrodynamic seal showing the installed, compressed cross-sectional configuration in conjunction with first and second machine components, the view corresponding to the narrowest part of the dynamic sealing lip shown in FIG. 1B.

The cross-sections of FIGS. 1B, 1C, and 1D relate to cutting planes that pass through that theoretical centerline/axis of the seal; i.e., the theoretical centerline lies on the cutting plane. The circumferential direction of relative rotation is normal (perpendicular) to the plane of the cross-sections, and the theoretical centerline of rotary seal 2 generally coincides with the axis of relative rotation.

Although illustrated as being straight, the lubricant side flank 16 can be curved or straight, or a combination of straight and curved portions, when viewed in a cross-section aligned with the theoretical axis of rotary seal 2, as taught by the prior art. In the cross-section view of FIG. 1C, the ridge flank 28 is also illustrated as being straight.

FIG. 1D

FIG. 1D is a fragmentary cross-sectional view that provides a general overview of how a preferred embodiment of the present invention may be employed when assembled into a machine. Referring now to FIG. 1D, the rotary seal 2 is shown in its installed condition.

Rotary seal 2 is oriented (i.e., positioned) by a first machine component 40 for sealing with respect to a relatively rotatable surface 56 of a second machine component 42. For the purpose of illustrating a typical application, the first machine component 40 is illustrated as having a generally circular seal groove that is defined by a first wall 44, a second wall 46 and a peripheral wall 48.

For the purpose of establishing consistent nomenclature herein, the seal "groove" is the annular void that is defined by the first wall 44, second wall 46 and peripheral wall 48, and the seal "gland" is the generally enclosed annular cavity having a boundary that is defined by the groove and the relatively rotatable surface 56.

An extrusion gap bore 64 establishes an extrusion gap clearance 66 with respect to the relatively rotatable surface 56 of the second machine component 42. Part of a chamber 50 is typically formed by a component bore 68 and the relatively rotatable surface 56. The first wall 44 and the second wall 46 are in generally opposed relation to one another. Within the seal industry, the first wall 44 is sometimes referred to as the "lubricant-side wall," and the second wall 46 is sometimes referred to as the "environment-side wall."

Although the first wall 44 and the second wall 46 are shown to be in fixed, permanent spaced relation to one another, such is not intended to limit the scope of the invention, for the manner of positioning the rotary seal 2 admits to other equally suitable forms. For example, the first wall 44 and/or the second wall 46 could be configured to be detachable from the first machine component 40 for ease of maintenance and repair, but then assembled in more or less fixed location for locating the rotary seal 2. For another example, it is common in some types of equipment for the first wall 44 to be part of a ring that is spring-loaded to force the rotary seal 2 into contact with the second wall 46 for reasons of skew avoidance. For yet another example, a detachable gland wall may be mandated when the rotary seal 2 is small in diameter, because such small seals cannot be deformed sufficiently to be installed within a groove that has fixed, non-detachable gland walls. The first body end 10 of rotary seal 2 generally faces the first wall 44, and the second body end 12 of rotary seal 2 generally faces the second wall 46.

First machine component 40 and second machine component 42 together typically define at least a portion of the chamber 50, which is typically used for locating a lubricant 52 and for defining a lubricant supply. The lubricant 52 is preferably exploited in this invention to lubricate the dynamic sealing interface between rotary seal 2 and the second machine component 42 during relative rotation thereof. Lubricant 52 is preferably a liquid-type lubricant such as a synthetic or natural oil, although other fluids including greases, water, and various process fluids are also suitable in some applications. An environment 54 may be any type of environmental media that the rotary seal 2 may be exposed to in service, such as any type of solid, liquid, or gaseous environmental media including, but not limited to, dirt, crushed rock, drilling fluid, manure, dust, lubricating media, a process media, seawater, air, a partial vacuum, a lubricant, etc. For purposes of this specification, the term "fluid" has its broadest meaning, encompassing both liquids and gases.

The purpose of rotary seal 2 is to establish sealing engagement with the relatively rotatable surface 56 of the second machine component 42 and with the first machine component 40, to retain a volume of the lubricant 52, to partition the lubricant 52 from the environment 54, and to exclude the environment 54 and prevent intrusion of the environment 54 into the lubricant 52, and to utilize the lubricant 52 to provide interfacial lubrication during periods or relative rotation between the rotary seal 2 and the relatively rotatable surface 56.

Relatively rotatable surface 56 of second machine component 42 and peripheral wall 48 of first machine component 40 are in spaced relation to each other. The spacing of relatively rotatable surface 56 and peripheral wall 48 is preferably sized to hold rotary seal 2 in compression. In the same manner as any conventional interference-type seal, such as an O-ring or an O-ring energized lip seal, compression of rotary seal 2 establishes a sealing relationship between static sealing surface 30 of rotary seal 2 and peripheral wall 48 of first machine component 40, and establishes a sealing relationship between the dynamic sealing lip 6 of rotary seal 2 and the relatively rotatable surface 56 of second machine component 42.

A portion of the static sealing surface 30 is typically in compressed contact with the peripheral wall 48. At least a portion of the dynamic sealing lip 6 is held in contacting and preferably compressed relation with relatively rotatable surface 56 of the second machine component 42. In dynamic operation, the relatively rotatable surface 56 has relative rotation with respect to dynamic sealing lip 6 of the rotary seal 2 and with respect to the first machine component 40. The present invention has application where either the first machine component 40 or the second machine component 42, or both, are individually rotatable.

The contacting relation of dynamic sealing lip 6 against the relatively rotatable surface 56 establishes and defines a sealing interface/interfacial contact footprint between dynamic sealing lip 6 and relatively rotatable surface 56, as taught by the commonly assigned prior art identified above. The sealing interface has a footprint width 58 that varies around the rotary seal 2. The footprint has a non-circular first footprint edge 60 that faces the lubricant 52, and a second footprint edge 62 of generally circular configuration that faces the environment 54 (the footprint edges 60 and 62 being identified by referencing the extension lines of the dimension for the footprint width 58 in FIG. 1D).

The exclusion edge 20 is of a configuration intended to develop substantially no hydrodynamic wedging activity during relative rotation between dynamic sealing lip 6 and relatively rotatable surface 56. Exclusion edge 20 presents a scraping edge to help exclude contaminant material from the interfacial contact footprint between dynamic sealing lip 6 and relatively rotatable surface 56, in the event of any relative movement occurring perpendicular to the direction of relative rotation between dynamic sealing lip 6 and relatively rotatable surface 56 (i.e., movement occurring from right to left or left to right in FIG. 1D).

When relative rotation is absent, a liquid-tight static sealing relationship is maintained at the interface between dynamic sealing lip 6 and relatively rotatable surface 56, and between static sealing surface 30 and peripheral wall 48. When relative rotation occurs between first machine component 40 and relatively rotatable surface 56, the rotary seal 2 preferably remains stationary with respect to peripheral wall 48 of first machine component 40 and maintains a static sealing relationship therewith, while the interface between dynamic sealing lip 6 and relatively rotatable surface 56 of second machine component 42 becomes a dynamic sealing interface, such that relatively rotatable surface 56 slips with respect to dynamic sealing lip 6 at a given rotational velocity. When relative rotation between dynamic sealing lip 6 and relatively rotatable surface 56 ceases, the sealing interface/interfacial contact footprint between dynamic sealing lip 6 and relatively rotatable surface 56 returns to being a static sealing interface.

Because the footprint between dynamic sealing lip 6 and relatively rotatable surface 56 has a first footprint edge 60 that is intentionally non-circular (e.g., wavy), it, in conjunction with the installed shape of dynamic sealing lip 6, produces a hydrodynamic wedging action in response to relative rotation between the rotary seal 2 and relatively rotatable surface 56. This hydrodynamic wedging action forces a film of the lubricant 52 into the interfacial contact footprint between the dynamic sealing lip 6 and relatively rotatable surface 56 for lubrication purposes. In other words, dynamic sealing lip 6 slips or hydroplanes on a film of lubricating fluid during periods of relative rotation between the dynamic sealing lip 6 and relatively rotatable surface 56. When relative rotation stops, the hydroplaning activity stops, and a static sealing relationship is re-established between dynamic sealing lip 6 and relatively rotatable surface 56.

The hydroplaning activity that occurs during relative rotation serves to minimize or prevent the typical dry rubbing wear and high friction associated with conventional non-hydrodynamic rubber and plastic seals, prolonging the useful life of the rotary seal 2 and the life of the relatively rotatable surface 56, and making higher speed, compression and differential pressure practical. During relative rotation, a net hydrodynamic-pumping related leakage of the lubricant 52 occurs as lubricant is transferred across the dynamic sealing interface and into the environment 54.

Due to second footprint edge 62 being substantially circular and substantially aligned with the possible directions of relative rotation, second footprint edge 62 does not produce a hydrodynamic wedging action in response to relative rotation between the dynamic sealing lip 6 and the relatively rotatable surface 56, thereby facilitating exclusion of the environment 54. The term "substantially circular" is used in recognition of the fact that perfect theoretical circularity is seldom if ever obtainable in any feature of any manufactured product in practice.

The seal body 4 of rotary seal 2 is illustrated as having an installed length that causes it to simultaneously contact the second wall 46 and the first wall 44 in certain operating conditions, in accordance with the axial constraint (skew-resisting confinement) teachings of commonly assigned U.S. Pat. No. 6,315,302. In other words, the first body end 10 of seal body 4 is illustrated as contacting the first wall 44 of first machine component 40, and the second body end 12 of seal body 4 is illustrated as contacting the second wall 46 of first machine component 40, in order to inhibit skew-induced wear. This is not meant to imply that the invention is limited to seals that have such skew-resisting confinement. The teachings of the invention are also applicable to seals where seal body 4 has an installed length that is shorter than the distance between the second wall 46 and the first wall 44.

Relatively rotatable surface 56 can take the form of an externally or internally oriented substantially cylindrical surface, as desired, with rotary seal 2 compressed radially between peripheral wall 48 and relatively rotatable surface 56, in which case the axis of relative rotation would be substantially parallel to relatively rotatable surface 56. In a radial sealing configuration, dynamic sealing lip 6 is oriented for compression in a substantially radial direction, and peripheral wall 48 may, if desired, be of substantially cylindrical configuration, and first wall 44 and second wall 46 may, if desired, be of substantially planar configuration.

Alternatively, relatively rotatable surface 56 can take the form of a substantially planar surface, with rotary seal 2 compressed axially between peripheral wall 48 and relatively rotatable surface 56 in a "face-sealing" arrangement, in which case the axis or relative rotation would be substantially perpendicular to relatively rotatable surface 56. In an axial (face) sealing configuration, dynamic sealing lip 6 would be oriented for compression in a substantially axial direction, peripheral wall 48 may be of substantially planar configuration, and first wall 44 and second wall 46 may, if desired, be of substantially cylindrical configuration. In the most common configuration, relatively rotatable surface 56 is an external cylindrical surface formed by an exterior surface of a shaft or sleeve.

In summary, the seal can be used as a radial seal or a face seal by configuring the dynamic sealing lip 6 to be located at either the inside diameter, the outside diameter, or the end of the seal, while maintaining the advantages of the invention that are disclosed herein.

Large diameter seals are torsionally weak or limp, and therefore, the cross-section of large diameter seals can be rotated so that the dynamic sealing lip 6 can face a relatively rotatable surface 56 of substantially planar or substantially cylindrical form, or even a sloped form. The torsional stiffness of small diameter seals is much higher, and therefore, small diameter seals should be manufactured to have the dynamic sealing lip 6 oriented in the desired orientation as dictated by the configuration of the relatively rotatable surface 56 of a given sealing application.

Simplified embodiments are possible wherein one or more of the features that are described above are omitted. Alternate embodiments are also possible, where one or more of the features that are described above are combined with different features of the prior art.

The "swept zone" is a term of art disclosed by U.S. Pat. App. Pub. No. 2009/0001671.

The function of the ridge 26 is to establish elevated interfacial contact pressure that diverts lubricant from the swept zone to locations within the dynamic interface where the lubricant film would otherwise be the thinnest. As described previously in conjunction with U.S. Pat. App. Pub. No. 2009/0001671, material displacement from the widest to the narrowest parts of the prior art dynamic lip decreases the size of the swept zone, and impairs interfacial lubrication. Because the ridge 26 crosses part of the sloping inlet surface 18, when severe operating conditions cause more and more of the sloping inlet surface 18 to come into contact with the relatively rotatable surface 56, more of the ridge 26 also comes into contact with the relatively rotatable surface 56, and ridge 26 thereby remains effective because part of the elevated interfacial contact pressure established by the ridge 26 remains within the swept zone.

FIG. 1E

Referring now to FIG. 1E, a fragmentary development of the seal footprint is shown generally at 70, and shows one wave. As taught by U.S. Pat. No. 4,610,319, the first footprint edge 60 is wavy, and the second footprint edge 62 is generally circular. The waviness of the first footprint edge 60 causes the seal footprint 70 to have wider and narrower locations. Using nomenclature established by the prior art, the seal footprint 70 has a swept zone 82 and an un-swept zone 84. A dashed line 85 is used to illustrate the boundary between the swept zone 82 and the un-swept zone 84. In the prior art, the swept zone is typically better lubricated than the un-swept zone.

For discussion purposes, a direction of relative rotation 76 is identified by an arrow, it being understood that rotation in some applications can reverse. Each wave of the seal footprint 70 has a wave leading edge $78_L$ and a wave trailing edge $78_T$, relative to the direction of relative rotation 76. When the direction of relative rotation reverses, the application of the leading edge/trailing edge appellations also reverses.

Zones of geometry-induced elevated contact pressure are represented by phantom lines on FIG. 1E. The zones are caused by the sloping inlet surface 18 and ridge 26 that are shown in FIG. 1A. For the sake of discussion, these zones are referred to as ridges, based on their ridge-like appearance on 3D contact pressure plots.

The sloping inlet surface 18 of FIG. 1A produces a leading pressure ridge $80_L$ and a trailing pressure ridge $80_T$. When the direction of relative rotation 76 reverses, these "leading" and "trailing" appellations also reverse. The leading pressure ridge $80_L$ and a trailing pressure ridge $80_T$ can take any suitable shape that is skewed with respect to the direction of relative rotation 76.

Preferably, the leading pressure ridge $80_L$ and trailing pressure ridge $80_T$ are interrupted by at least one diverting pressure ridge 72 that is produced by the ridge 26 described earlier in conjunction with FIG. 1A. The diverting pressure ridge 72 can take any suitable shape, such as the curved shape that is shown. A portion of the diverting pressure ridge 72 can come closer to the second footprint edge 62 as shown, or if desired the diverting pressure ridge 72 can be parallel to the second footprint edge 62, as shown in conjunction with FIG. 4. The diverting pressure ridge 72 has a leading edge $72_L$ and a trailing edge $72_T$, relative to the direction of relative rotation 76. When the direction of relative rotation reverses, the application of the "leading" and "trailing" appellations also reverses.

The wave leading edge $78_L$ is a site of hydrodynamic wedging action during relative rotation between the rotary seal and the mating relatively rotatable surface. This hydrodynamic wedging action forces a film of lubricating fluid into the seal footprint 70 for lubrication purposes. The relatively rotatable surface is wetted with the lubricant 52, and the relative rotation drags a film of the lubricant past the wave leading edge $78_L$ and into the swept zone 82 of the seal footprint 70, as represented by Arrow 106.

Some of the film of the lubricant within the swept zone 82 crosses the leading pressure ridge $80_L$, and some of the film of the lubricant within the swept zone 82 is diverted away from the second footprint edge 62 by the leading pressure ridge $80_L$.

Some of the film of the lubricant within the swept zone 82 crosses the leading part of the diverting pressure ridge 72, and some the film of the lubricant is diverted toward and into the un-swept zone 84 and toward and past the second footprint edge 62 by the leading part of the diverting pressure ridge 72. Such lubricant is thus diverted past the second footprint edge 62 and into the environment 54.

Some of the lubricant film that was initially diverted away from the second footprint edge 62 by the leading pressure ridge $SO_L$ is thus diverted toward and past the second footprint edge 62 by the diverting pressure ridge 72. In the prior art, this lubricant film would have simply been lost out of the wave trailing edge $78_T$.

Some of the film of the lubricant within the swept zone 82 crosses the trailing part of the diverting pressure ridge 72, and some the film of the lubricant is diverted toward the first footprint edge 60 by the trailing part of the diverting pressure ridge 72. This matters very little, as the swept zone 82 has an abundance of lubricant film. Some of the film of the lubricant within the swept zone 82 crosses the trailing pressure ridge $80_T$, and some of the film of the lubricant is diverted toward the second footprint edge 62 by the trailing pressure ridge $80_T$. The net effect is that both the swept zone 82 and the un-swept zone 84 are lubricated by the film of lubricant.

A drawback of relying solely on the trailing pressure ridge $80_T$ would be that its location, magnitude, and shape are dictated by the location and shape of the sloping inlet surface 18 that is shown in FIG. 1A. This is a limitation of the prior art as well. An important advantage of the diverting pressure ridge 72 is that its location, magnitude, and shape can be managed independently of the sloping inlet surface 18, and thus a thicker film of the lubricant can be diverted to those specific locations of the seal footprint 70 that require the most lubrication—regardless of where those specific locations are situated relative to the sloping inlet surface 18 that is shown in FIG. 1A. This is accomplished by adjusting dimension 104. On seals with more than one wave, dimension 104 need not be the same on every wave; it can be advantageous to vary the size of dimension 104 on some waves to distribute lubricant more effectively to the zones within the seal footprint 70 that require more lubricant film.

Another important advantage of the diverting pressure ridge 72 is that it extends closer to the first footprint edge 60, compared to the distance that separates the leading pressure ridge $80_L$ from the first footprint edge 60. This means that the diverting pressure ridge 72 can divert lubricant toward the second footprint edge 62 that could not be so-diverted in the prior art. In other words, some of the film of the lubricant that would have been lost out of the trailing edges of prior art waves is diverted toward the second footprint edge 62 by the diverting pressure ridge 72 of the present invention.

As described previously in conjunction with FIG. 1A, it is desirable that the ridge 26 becomes less abrupt as it comes nearer to the exclusion edge 20. This is so the magnitude of interfacial contact pressure within the diverting pressure ridge 72 becomes diminished as the diverting pressure ridge 72 comes closer to the second footprint edge 62. The ridge 26 that was described in conjunction with previous figures is preferably not so abrupt that no lubricant whatsoever can cross the diverting pressure ridge 72. This is an important consideration so that trailing portions of the swept zone 82 remain lubricated.

A limitation of the prior art is that so much of the lubricant within the swept zone is not diverted into the un-swept zone, and is simply lost out of the trailing edge of the wave. The ridge 26 of the preferred embodiment of the present invention ensures that no more lubricant than necessary for swept zone lubrication remains within the swept zone 82.

The controlled diversion provided by the diverting pressure ridge 72 provides more complete lubrication in critical areas of the un-swept zone 84, in either direction of rotation. The preferred embodiment of the invention is suitable for a wider range of service conditions, including faster and slower rotary speeds, higher differential pressures, and thinner lubricants. Running torque is reduced, resulting in less self-generated heat. The result is better tolerance to high ambient environment temperature, less heat-related compression set, less footprint spread, less seal wear, longer polymer life, a higher retained modulus for improved extrusion resistance, lower interfacial contact pressure when installed in skew-resisting confinement, less slippage within the groove, and less tendency to cause floating compensation pistons to rotate. This is accomplished by a geometry that requires less seal volume, for improved compatibility with skew-resisting confinement.

FIG. 2

Figure 2:
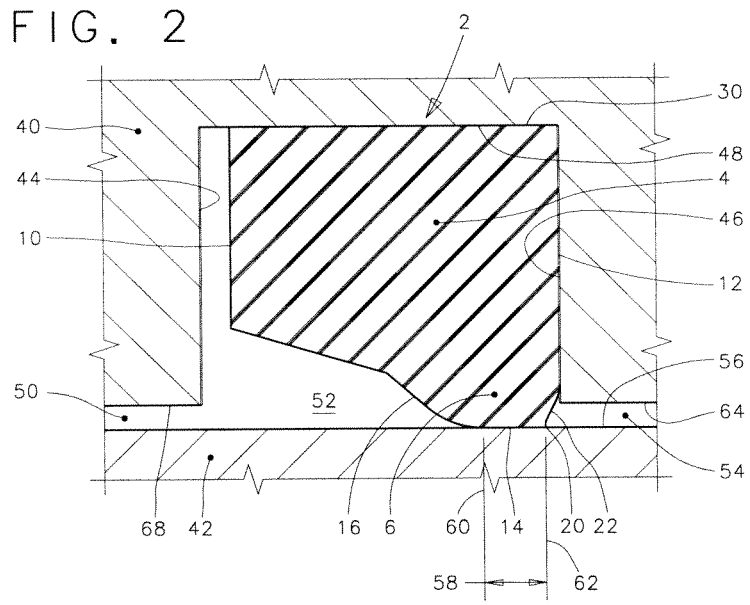
FIG. 2 is a fragmentary cross-sectional view of an alternate embodiment of the present invention showing the installed, compressed cross-sectional configuration of a hydrodynamic seal in conjunction with first and second machine components.

FIG. 2 shows an alternate embodiment of the invention, where the rotary seal 2 is shown in its installed condition. FIG. 2 illustrates that the principles taught herein are applicable to assemblies that do not use the principle of axial constraint that is taught by commonly assigned U.S. Pat. No. 6,315,302, and illustrated in FIG. 1D herein. Note that the seal body 4 is not in simultaneous contact with the first wall 44 and the second wall 46 of the groove that is present in the first machine component 40. In FIG. 2, various features of the seal and machine components are labeled to orient the reader, bearing in mind that features throughout this specification that are represented by like numbers have the same basic function.

In FIG. 2, the rotary seal 2 is shown located in a position within the seal groove that would occur if the pressure of the lubricant 52 were higher than the pressure of the environment 54. In such pressure conditions, the hydrostatic force resulting from the lubricant pressure acting over the area between the relatively rotatable surface 56 and peripheral wall 48 forces the second body end 12 of the rotary seal 2 against the second wall 46. This leaves a gap between the first body end 10 and the first wall 44. If the differential pressure were acting in the opposite direction, such that the pressure of the environment 54 were higher than the pressure of the lubricant 52, the seal would slide in response to the differential pressure, bringing the first body end 10 into supporting contact with the first wall 44, and opening up a gap between the second body end 12 and the second wall 46.

FIG. 3

Figure 3:
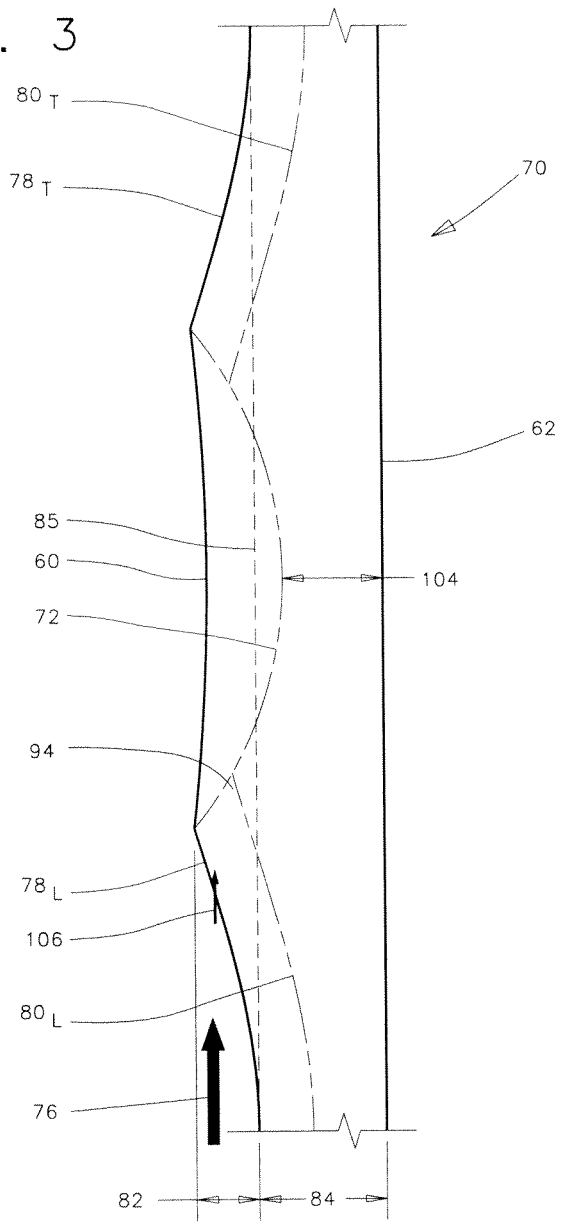
FIGS. 3 and 4 are fragmentary views similar to FIG. 1E of alternate interfacial contact footprints.

FIG. 3 illustrates that a slightly different version of the seal footprint 70 can be achieved if desired. Remembering that features throughout this specification that are represented by like numbers have the same basic function, various features are numbered for orienting the reader, including first footprint edge 60, second footprint edge 62, diverting pressure ridge 72, direction of relative rotation 76, wave leading edge $78_L$, wave trailing edge $78_T$, leading pressure ridge $80_L$, trailing pressure ridge $80_T$, swept zone 82, un-swept zone 84, dashed line 85, arrow 106, and dimension 104. In FIG. 1E, at the wider location of the seal footprint 70, the first footprint edge 60 is convex in the region near the diverting pressure ridge. In FIG. 3, at the wider location of the seal footprint 70, the first footprint edge 60 is concave in the region near the diverting pressure ridge. Dynamic lip shapes are possible where the edge in the region near the diverting pressure ridge of the seal footprint 70 is convex in some operating conditions, and concave in other operating conditions. Factors such as seal temperature and degree of initial compression can cause the local portion of the first footprint edge 60 to switch from convex to concave. Dynamic lip shapes are possible that always produce a convex edge shape near the diverting pressure ridge 72, and dynamic lip shapes are also possible that always produce a concave shape near the diverting pressure ridge 72.

FIG. 4

Figure 4:
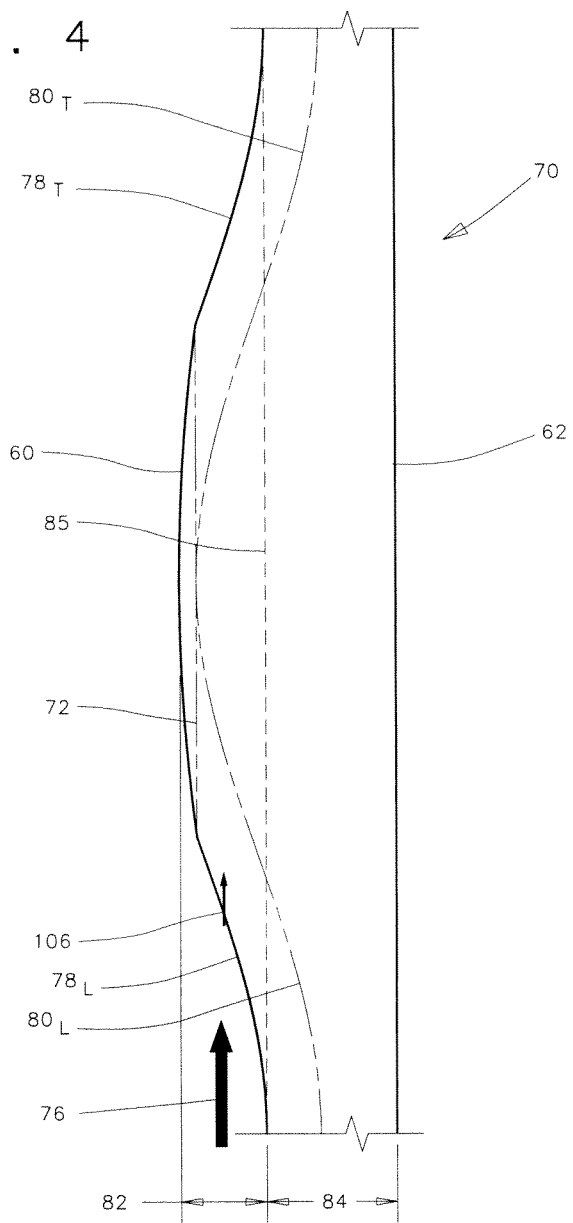

FIG. 4 is fragmentary development of an alternate embodiment of the seal footprint arrangement. The seal footprint is shown generally at 70. The first footprint edge 60 is wavy, and the second footprint edge 62 is generally circular and has a swept zone 82 and an un-swept zone 84. Dashed line 85 illustrates the boundary between the swept zone 82 and the un-swept zone 84.

A direction of relative rotation 76 is identified by an arrow. Each wave of the seal footprint 70 has a wave leading edge $78_L$ and a wave trailing edge $78_T$, relative to the direction of relative rotation 76.

A sloping surface of the rotary seal produces a leading pressure ridge $80_L$ and a trailing pressure ridge $80_T$ that are interrupted by at least one diverting pressure ridge 72 that is produced by a ridge of the rotary seal. The diverting pressure ridge 72 is generally parallel to the second footprint edge 62.

Relative rotation drags a film of the lubricant past the wave leading edge $78_L$ and into the swept zone 82 of the seal footprint 70.

Some of the film of the lubricant within the swept zone 82 crosses the leading pressure ridge $80_L$, and some of the film of the lubricant within the swept zone 82 is diverted away from the second footprint edge 62 by the leading pressure ridge $80_L$.

Some of the film of the lubricant within the swept zone 82 crosses the leading part of the diverting pressure ridge 72, and some the film of the lubricant is diverted circumferentially toward the trailing pressure ridge $80_T$. The diverting pressure ridge 72 thus diverts some the film of the lubricant back into the seal footprint 70 that would otherwise have leaked out along the trailing portion of the wave in the prior art, and presents that lubricant to the trailing pressure ridge $80_T$.

Some of the film of the lubricant within the swept zone 82 crosses the trailing pressure ridge $80_T$, and some of the film of the lubricant is diverted into the un-swept zone 84 and toward and past the second footprint edge 62 by the trailing pressure ridge $80_T$.

The net effect is that both the swept zone 82 and the un-swept zone 84 are lubricated by the film of lubricant, and locations that would have been less well lubricated in the prior art are now better lubricated.

FIG. 5

Figure 5:
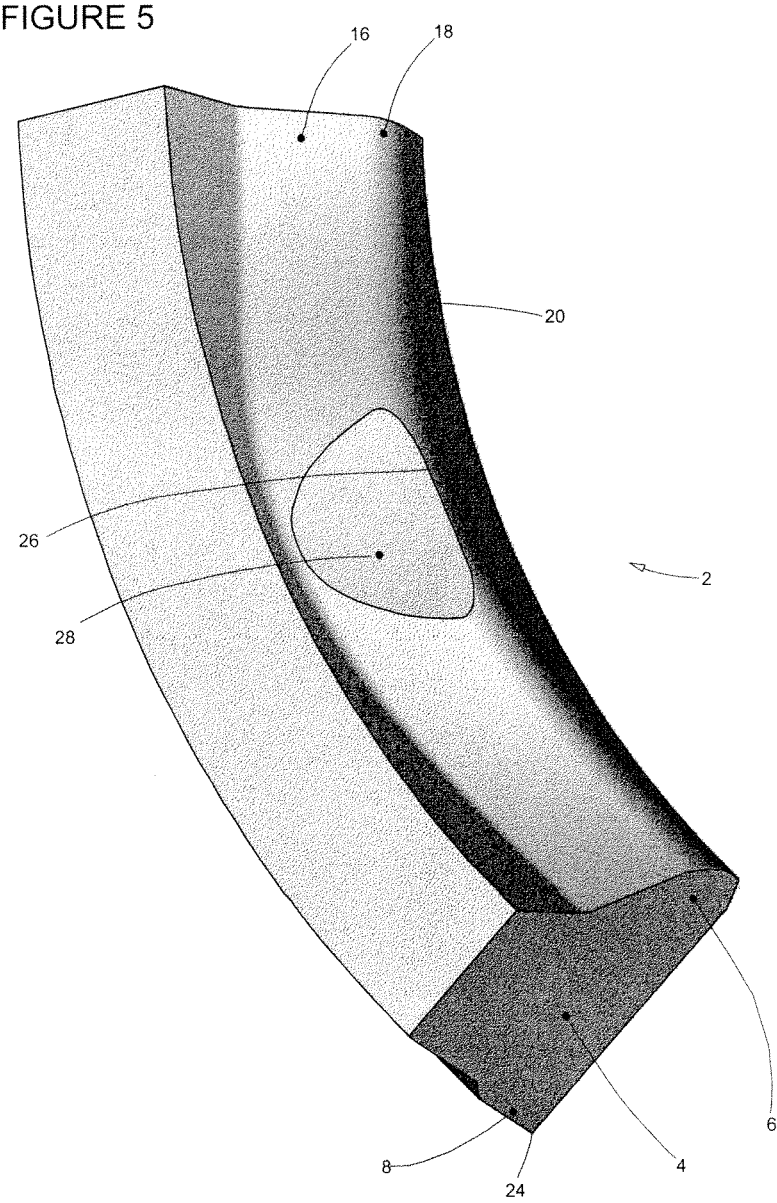
FIGS. 5-8 are enlarged fragmentary shaded perspective views of a ring-shaped hydrodynamic seal having a dynamic sealing lip according to other embodiments of the present invention, the seals being shown in an uncompressed and uninstalled condition.

FIG. 5 is a fragmentary shaded perspective view representing a ring-shaped rotary seal shown generally at 2 that represents an embodiment of the present invention in the uncompressed, uninstalled condition.

The rotary seal 2 includes a generally annular dynamic sealing lip 6 projecting from the seal body 4, and preferably incorporates a static sealing lip 8 projecting from the seal body 4 in generally opposed relation to the dynamic sealing lip 6.

The dynamic sealing lip 6 incorporates a dynamic sealing surface of any suitable shape, and has a wavy lubricant side flank 16 that can if desired, vary in slope around the rotary seal 2.

The dynamic sealing lip 6 incorporates a sloping inlet surface 18 that can take any suitable form that is suitable for forming part of a skewed hydrodynamic inlet when the rotary seal 2 is installed. As shown, some portions of the lubricant side flank 16 are preferably blended by the sloping inlet surface 18.

The dynamic sealing lip 6 incorporates an exclusion edge 20 that has generally abrupt form, and is generally circular. A static sealing lip 8 incorporates a static exclusionary intersection 24.

In FIG. 1A, the ridge flank 28 and ridge 26 truncate the part of the dynamic sealing lip 6 that included the dynamic sealing surface 14 and the sloping inlet surface 18. FIG. 5 shows an embodiment where the ridge flank 28 and ridge 26 truncate the part of the dynamic sealing lip 6 that includes the sloping inlet surface 18 and the lubricant side flank 16.

Although illustrated as a sharp intersection, the ridge 26 may, if desired, have a more rounded character.

When a seal such as shown in FIG. 5 is installed and operating, the location of the first footprint edge of the seal footprint varies with temperature, and can be at any location along the sloping inlet surface 18, or even a little past the sloping inlet surface 18 and slightly onto the lubricant side flank 16. Regardless of the temperature-related spread of the seal footprint, the ridge 26 will create a diverting pressure ridge within the seal footprint that causes the film of lubricant to migrate toward and past the exclusion edge 20 and into the Environment during periods of relative rotation. This is a distinct advantage over the prior art, as it solves the problem outlined in U.S. Pat. App. Pub. No. 2009/0001671 by subtracting seal volume, rather than adding seal volume.

Preferably, the ridge flank 28 truncates at least a portion of the sloping inlet surface 18 and preferably the ridge 26 traverses along at least a portion of the sloping inlet surface 18, establishing the edge/boundary of at least a portion of the sloping inlet surface 18. As shown by FIG. 5, the ridge flank 28 may also truncate the lubricant side Flank 16 and the ridge 26 can, if desired, establish an edge/boundary of the lubricant side flank 16.

FIG. 6

Figure 6:
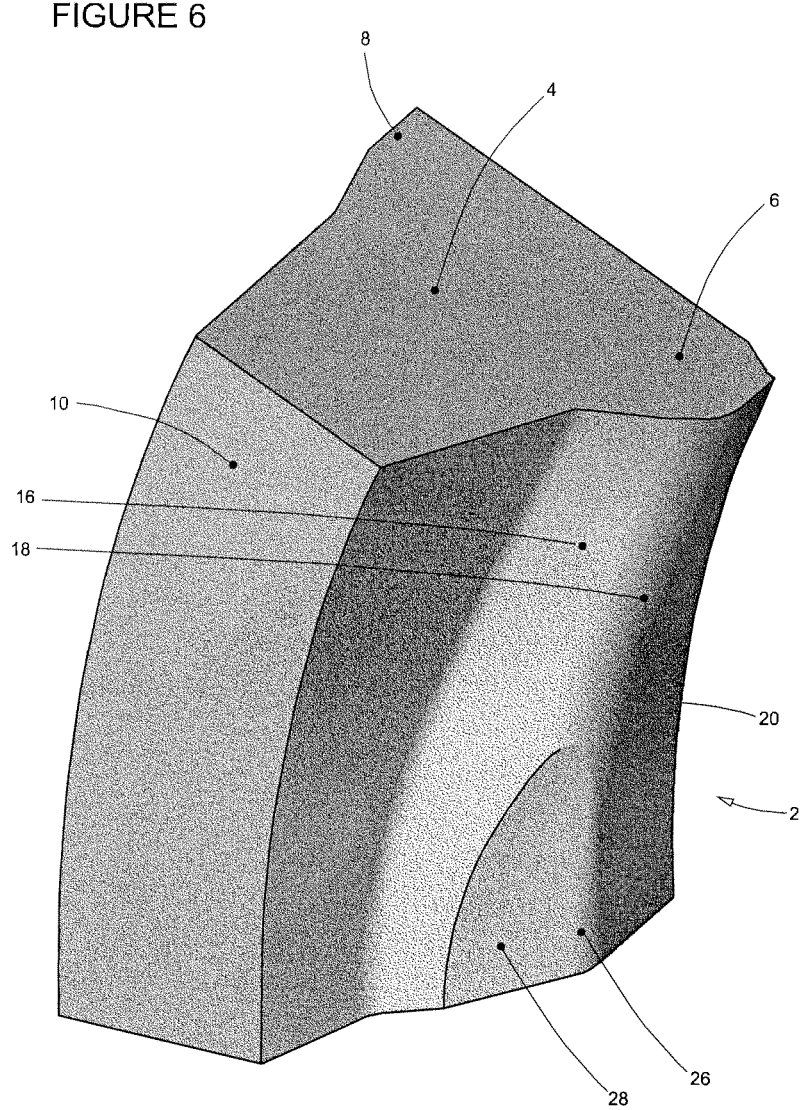

FIG. 6 is a fragmentary shaded perspective view representing a ring-shaped rotary seal shown generally at 2 that represents an embodiment of the present invention in the uncompressed, uninstalled condition.

The rotary seal 2 includes a generally annular dynamic sealing lip 6 projecting from the seal body 4, and preferably incorporates a static sealing lip 8 that is oriented in generally opposed relation to the dynamic sealing lip 6. The dynamic sealing lip 6 has a wavy lubricant side flank 16 that can, if desired, vary in slope around the rotary seal 2.

The dynamic sealing lip 6 incorporates a sloping inlet surface 18 that forms part of a hydrodynamic inlet when the rotary seal 2 is installed, and preferably provides a smooth blended transition to the lubricant side flank 16 and preferably provides a smooth blended transition to the dynamic sealing surface. The dynamic sealing lip 6 also incorporates an abrupt exclusion edge 20 that is preferably generally circular in the installed condition.

In FIG. 6, only one half of one wave is shown, so that more detail can be shown. The ridge flank 28 and ridge 26 truncate the part of the dynamic sealing lip 6 that includes the sloping inlet surface 18 and the lubricant side flank 16. The ridge 26 has a rounded character that preferably varies in curvature along the length of the ridge 26. The rounded character can be provided by any suitable curvature, such as, but not limited to, a radius, a portion of an ellipse, a portion of a sine wave curve, a portion of a parabolic curve, a portion of a cycloid curve, a portion of witch/versiera curves, or combinations thereof.

As noted in above in connection with another figure, the ridge 26 produces a diverting pressure ridge within the seal footprint when the seal is installed. The variable curvature that is shown in FIG. 6 causes the magnitude of contact pressure within the diverting pressure ridge to be controlled at the location where the ridge 26 approaches closer to the exclusion edge 20, because the size of the curvature influences interfacial contact pressure.

Preferably, the ridge flank 28 truncates at least a portion of the sloping inlet surface 18 and preferably the ridge 26 traverses along at least a portion of the sloping inlet surface 18, establishing the edge/boundary of at least a portion of the sloping inlet surface 18. As shown by FIG. 6, the ridge flank 28 may also truncate the lubricant side flank 16 and the ridge 26 can, if desired, establish an edge/boundary of the lubricant side flank 16.

FIG. 7

Figure 7:
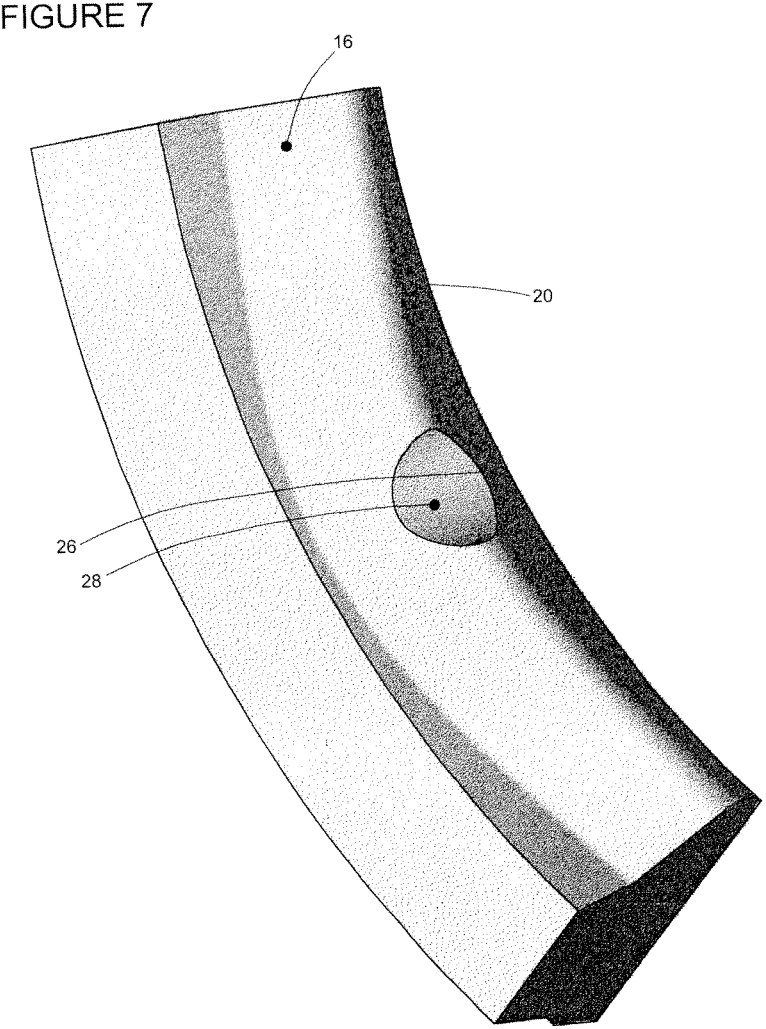

FIG. 7 is a fragmentary shaded perspective view representing a ring-shaped rotary seal shown generally at 2 that represents an embodiment of the present invention in the uncompressed, uninstalled condition.

FIG. 7 shows that the ridge flank 28 can be configured so that it truncates and bifurcates the sloping inlet surface 18 and truncates the dynamic sealing surface 14, and truncates the lubricant side flank 16. As shown, the ridge flank 28 can be configured to establish a portion of the edge of the sloping inlet surface 18, to establish a portion of the edge of the lubricant side flank 16, and to establish a portion of the edges of the bifurcated sloping inlet surface 18.

FIG. 8

Figure 8:
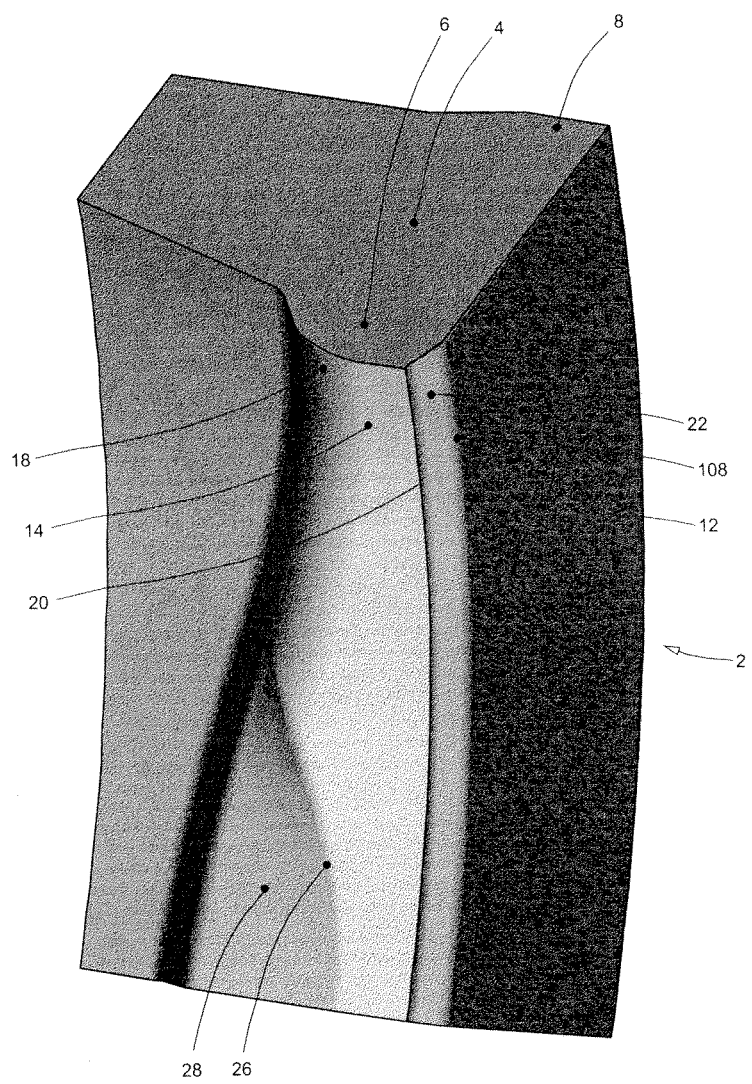

FIG. 8 is a fragmentary shaded perspective view representing a ring-shaped rotary seal shown generally at 2 that represents an embodiment of the present invention in the uncompressed, uninstalled condition. Only one half of one wave is shown so that more detail is visible.

One side of the dynamic sealing lip 6 is wavy, as taught by the prior art. The ridge flank 28 and ridge 26 truncate the part of the dynamic sealing lip 6 that includes the sloping inlet surface 18 and preferably also truncate the dynamic sealing surface 14. The entire boundary of the ridge flank 28, including the ridge 26, has a rounded character.

FIG. 8 also shows that if desired, a flexible transitional heel 22 can be used, and shows that the heel transition 108 between the flexible transitional heel 22 and the second body end 12 can have a rounded character, which provides improved seal performance when the seal is exposed to certain of the aforementioned severe operating conditions by virtue of allowing improved control of interfacial contact pressure within the dynamic sealing interface. The heel transition 108 also facilitates tooling manufacture in certain circumstances. The rounded character can be any suitable curvature, such as, but not limited to, a radius, a portion of an ellipse, a portion of a sine wave curve, a portion of a parabolic curve, a portion of a cycloid curve, a portion of witch/versiera curves, or combinations thereof.

For the purpose of orienting the reader, several features are labeled, such as the seal body 4 and the static sealing lip 8 that is oriented in generally opposed relation to the dynamic sealing lip 6.

The dynamic sealing lip 6 incorporates a sloping inlet surface 18 that forms part of a hydrodynamic inlet when the rotary seal 2 is installed, and preferably provides a smooth blended transition to the lubricant side flank, and preferably provides a smooth blended transition to the dynamic sealing surface 14. The dynamic sealing lip 6 also incorporates an abrupt exclusion edge 20 that is preferably generally circular in the installed condition.

Preferably, the ridge flank 28 truncates at least a portion of the sloping inlet surface 18 and preferably the ridge 26 traverses along at least a portion of the sloping inlet surface 18, establishing the edge/boundary of at least a portion of the sloping inlet surface 18. As shown by FIG. 6, the ridge flank 28 may also truncate the lubricant side flank 16 and the ridge 26 can, if desired, establish an edge/boundary of the lubricant side flank 16.

In view of the foregoing it is evident that the present invention is one that is well adapted to attain all of the objects and features hereinabove set forth, together with other objects and features which are inherent in the apparatus disclosed herein. Even though several specific geometries are disclosed in detail herein, many other geometrical variations employing the basic principles and teachings of this invention are possible.

The foregoing disclosure and description of the preferred embodiments of the present invention are illustrative and explanatory thereof, and various changes in the size, shape and materials, as well as in the details of the illustrated construction, may be made without departing from the spirit of the invention. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A hydrodynamic rotary seal comprising:
   a generally circular seal body having a first body end and a second body end facing in generally opposite directions, said generally circular seal body comprising:
   a generally outwardly-facing static sealing surface;
   a dynamic sealing lip of generally annular form projecting radially inward from said seal body and located radially inward from said static sealing surface and having a width that varies, said dynamic sealing lip comprising:

a lubricant side flank, being a surface located in intermediate relation to said first and second body ends and located in spaced relation to said second body end, at least a portion of said lubricant side flank being skewed relative to said second body end;

a generally inwardly-facing annular dynamic sealing surface located in intermediate relation to said lubricant side flank and said second body end and terminating at an abrupt exclusion edge of generally circular form that is located proximate said second body end;

an inlet surface adapted for forming part of a hydrodynamic inlet upon installation, said inlet surface located between said lubricant side flank and said dynamic sealing surface, said inlet surface blending at least a portion of said dynamic sealing surface to at least a portion of said lubricant side flank, said lubricant side flank being radially outward of said inlet surface, said inlet surface providing a smooth blended axial transition to at least part of said dynamic sealing surface, said inlet surface defining first and second sloping inlet surfaces along an annular circumference of said dynamic sealing lip, each of said first and second sloping inlet surfaces having a convex curved form when viewed in longitudinal cross-section, at least a portion of said first sloping inlet surface being skewed relative to said abrupt exclusion edge, at least a portion of said second sloping inlet surface being skewed relative to said abrupt exclusion edge and substantially oppositely of the skewed portion of said first sloping inlet surface; and a ridge flank bounded by a ridge flank boundary, the entire said ridge flank boundary defining an external corner in an axial direction, said ridge flank located in intermediate relation to said first body end and said dynamic sealing surface and comprising a surface radially outward of said dynamic sealing surface, said ridge flank intersecting said dynamic sealing surface and said lubricant side flank to form portions of said ridge flank boundary, said ridge flank located in intermediate relation to and intersecting said first and second sloping inlet surfaces to form additional portions of said ridge flank boundary, at least a portion of said ridge flank boundary defining a ridge having a length along the annular circumference of said dynamic sealing lip, at least a portion of said first sloping inlet surface and at least a portion of said second sloping inlet surface being truncated by said ridge flank and said ridge;

at least part of said ridge being curved along said ridge length relative to said abrupt exclusion edge so that some of said ridge is farther from said abrupt exclusion edge compared to a part of said ridge which is closer to said abrupt exclusion edge, there being a separating distance between said ridge and said abrupt exclusion edge; and wherein when viewed in longitudinal cross-section, no portion of said ridge flank is closer to said abrupt exclusion edge than said ridge.

2. The hydrodynamic rotary seal of claim 1, wherein said ridge is abrupt in the axial direction and becomes less abrupt along the length of said ridge as said ridge comes closer to said abrupt exclusion edge.

3. The hydrodynamic rotary seal of claim 1, wherein said ridge is abrupt with local curvature in the axial direction and varies in curvature along the length of said ridge.

4. The hydrodynamic rotary seal of claim 1, wherein said ridge extends between the skewed portions of said first and second sloping inlet surfaces.

5. The hydrodynamic rotary seal of claim 1, wherein at least part of said ridge is curved when viewed in longitudinal cross-section, and varies in axial position relative to said abrupt exclusion edge along the length of said ridge.

6. The hydrodynamic rotary seal of claim 1, wherein when viewed in longitudinal cross-section said ridge flank is substantially straight with an angle being defined between said ridge flank and said dynamic sealing surface, and said angle varies along the length of said ridge.

7. The hydrodynamic rotary seal of claim 1, wherein said ridge flank truncates at least a portion of said dynamic sealing surface.

8. The hydrodynamic rotary seal of claim 1, wherein said ridge flank truncates at least a portion of said lubricant side flank.

9. The hydrodynamic rotary seal of claim 7, wherein said ridge flank truncates at least a portion of said lubricant side flank.

10. The hydrodynamic rotary seal of claim 1, wherein said ridge is defined at least in part by a sharp intersection between said ridge flank and said first and second sloping inlet surfaces.

11. The hydrodynamic rotary seal of claim 1, wherein said ridge is defined at least in part by a rounded intersection between said ridge flank and said first and second sloping inlet surfaces.

12. The hydrodynamic rotary seal of claim 8, wherein said lubricant side flank varies in slope along the annular circumference of said dynamic sealing lip.

13. The hydrodynamic rotary seal of claim 1, wherein said ridge traverses along at least a portion of said inlet surface establishing an edge of said at least a portion of said inlet surface.

14. The hydrodynamic rotary seal of claim 1, wherein said ridge includes a portion curving towards said abrupt exclusion edge and a portion curving away from said abrupt exclusion edge along the length of said ridge.

15. The hydrodynamic rotary seal of claim 1, wherein said ridge flank is located between and adjoining said lubricant side flank and said dynamic sealing surface.

16. A hydrodynamic rotary seal having an annular seal body with generally oppositely facing first and second body ends, a generally outwardly facing static sealing surface, and an annular dynamic sealing lip located in intermediate relation to said first and second body ends and adapted for compressed contacting relationship with a relatively rotatable surface having a direction of relative rotation, the dynamic sealing lip having an abrupt, generally circular exclusion edge located axially remote from the first body end, and having a lubricant side flank and an inlet surface located in intermediate relation to the first body end and the exclusion edge, the lubricant side flank being radially outward of the inlet surface and the inlet surface comprising first and second sloping inlet surfaces having a convex shape when viewed in longitudinal cross-section, at least a portion of the first sloping inlet surface being skewed relative to the circular exclusion edge, at least a portion of the second sloping inlet surface being skewed relative to the circular exclusion edge and substantially oppositely of the skewed portion of the first sloping inlet surface, wherein the improvement comprises:

the dynamic sealing lip including a ridge flank located in intermediate relation to the first body end and the exclusion edge, located in intermediate relation to the first and second sloping inlet surfaces, and separated by a distance from the exclusion edge, at least a portion of said ridge flank being radially outward of the first and second sloping inlet surfaces;

said ridge flank intersecting the lubricant side flank and producing an external corner when viewed in longitudinal cross-section;

a ridge defined in part by an external corner at an intersection of the first sloping inlet surface and said ridge flank and defined in part by an external corner at an intersection of the second sloping inlet surface and said ridge flank, the first and second sloping inlet surfaces being truncated by said ridge and said ridge flank, at least part of said ridge being curved so that some of said ridge is farther from the exclusion edge compared to a part of said ridge which is closer to the exclusion edge, there being a separating distance between said ridge and the exclusion edge;

a first portion of said ridge establishing a boundary of at least a portion of the first sloping inlet surface and being skewed relative to the exclusion edge and skewed generally oppositely of the skewed portion of the first sloping inlet surface; and a second portion of said ridge establishing a boundary of at least a portion of the second sloping inlet surface and being skewed relative to the exclusion edge and skewed generally oppositely of the skewed portion of the second sloping inlet surface.

17. The hydrodynamic rotary seal of claim 16, wherein at least a portion of said ridge is abrupt in an axial direction and said ridge becomes less abrupt as said ridge comes closer to the exclusion edge.

18. The hydrodynamic rotary seal of claim 16, wherein said ridge has a length in a circumferential direction and said ridge in an axial direction has a rounded character that varies in curvature along the length of said ridge.

19. The hydrodynamic rotary seal of claim 16, wherein said ridge extends between the skewed portions of the first and second sloping inlet surfaces.

20. The hydrodynamic rotary seal of claim 16, wherein said ridge has a length in a circumferential direction, at least part of said ridge is curved when viewed in longitudinal cross-section, and varies in axial position relative to the exclusion edge along the length of said ridge.

21. The hydrodynamic rotary seal of claim 16, wherein said ridge has a length in a circumferential direction and said ridge flank has a slope that varies in an axial direction along the length of said ridge.

22. The hydrodynamic rotary seal of claim 16, wherein the dynamic sealing lip includes a dynamic sealing surface and said ridge flank truncates at least a portion of the dynamic sealing surface, at least a portion of the dynamic sealing surface being located between the exclusion edge and the inlet surface.

23. The hydrodynamic rotary seal of claim 22, wherein said ridge flank truncates at least a portion of the lubricant side flank.

24. The hydrodynamic rotary seal of claim 16, wherein said ridge is defined at least in part by a sharp intersection between said ridge flank and the first and second sloping inlet surfaces.

25. The hydrodynamic rotary seal of claim 16, wherein said ridge is defined at least in part by a rounded intersection between said ridge flank and the first and second sloping inlet surfaces.

26. The hydrodynamic rotary seal of claim 16, wherein at least a portion of said ridge is parallel to the exclusion edge.

27. The hydrodynamic rotary seal of claim 16, wherein said ridge has a length in a circumferential direction and said ridge includes a portion curving towards the exclusion edge and a portion curving away from the exclusion edge along the length of said ridge.

28. The hydrodynamic rotary seal of claim 23, wherein said ridge flank is located between and adjoining the lubricant side flank and the dynamic sealing surface.

29. A hydrodynamic rotary seal having an annular seal body having first and second body ends, a static sealing surface and an annular dynamic sealing lip in compressed contacting relationship with a relatively rotatable surface having a direction of relative rotation and defining an interfacial contact footprint therebetween, wherein the contact footprint has a substantially circular edge and a wavy edge including at least one wave having a wave height, the contact footprint has a minimum footprint width and a maximum footprint width between the circular edge and the wavy edge, wherein a swept zone is defined by the portion of the contact footprint circumferentially aligned with the wave height and an unswept zone is defined by the portion of the contact footprint circumferentially aligned with the minimum footprint width, wherein the dynamic sealing lip having a dynamic sealing surface located between the first and second body ends and terminating at an abrupt generally circular exclusion edge, a sloping inlet surface having a convex shape when viewed in longitudinal cross-section and located between the first body end and the dynamic sealing surface, a lubricant side flank having at least a portion thereof located between the first body end and the sloping inlet surface, the sloping inlet surface providing a transition between at least a portion of the lubricant side flank and at least a portion of the dynamic sealing surface, at least part of the sloping inlet surface being skewed with respect to the direction of relative rotation and forming at least part of a hydrodynamic inlet where the dynamic sealing lip gradually converges into contact with the relatively rotatable surface, the hydrodynamic inlet introducing a lubricant into the contact footprint in response to the relative rotation between the dynamic sealing lip and the relatively rotatable surface, wherein the improvement comprises:

the dynamic sealing lip including a ridge flank having a boundary, at least a first portion of said ridge flank boundary at an intersection of said ridge flank and the sloping inlet surface and at least a second portion of said ridge flank boundary at an intersection of said ridge flank and the dynamic sealing surface, said at least the first portion of said ridge flank boundary comprising a first ridge portion defining an external corner when viewed in longitudinal cross-section, said at least the second portion of said ridge flank boundary comprising a second ridge portion defining an external corner when viewed in longitudinal cross-section, a ridge comprising said first and second ridge portions, said ridge producing a diverting pressure ridge within the contact footprint and diverting at least a portion of the lubricant from the swept zone into the unswept zone and toward the exclusion edge in response to the relative rotation between the dynamic sealing lip and the relatively rotatable surface;

said ridge having a length and being curved in the circumferential direction so that some of said ridge is farther from the generally circular exclusion edge compared to a part of said ridge which is closer to the generally circular exclusion edge, there being an axial separating distance between said ridge and the exclusion edge;

at least a portion of said diverting pressure ridge being located in the swept zone and skewed with respect to the direction of relative rotation.

30. The hydrodynamic rotary seal of claim 29, wherein said ridge is abrupt in an axial direction and becomes less abrupt along the length of said ridge as said ridge comes closer to the exclusion edge.

31. The hydrodynamic rotary seal of claim 29, wherein said ridge in an axial direction has a rounded character that varies in curvature along the length of said ridge.

32. The hydrodynamic rotary seal of claim 29, wherein said ridge flank is located between and adjoining the lubricant side flank and the dynamic sealing surface.

33. The hydrodynamic rotary seal of claim 29, wherein said ridge flank producing a visual appearance of cutting away a portion of the sloping inlet surface and a portion of the dynamic sealing surface.

34. The hydrodynamic rotary seal of claim 29, wherein at least a portion of said ridge flank is recessed relative to the sloping inlet surface and relative to the dynamic sealing surface.

35. The hydrodynamic rotary seal of claim 29, wherein the dynamic lip having a visual appearance, said visual appearance being that the sloping inlet surface and the dynamic sealing surface have a portion cut away by said ridge flank.

36. A hydrodynamic sealing assembly comprising:
a first machine component defining a seal groove;
a second machine component including a relatively rotatable surface having a direction of relative rotation; and
a hydrodynamic seal in sealing engagement with said first and second machine components, said hydrodynamic seal comprising:
a generally circular seal body having first and second body ends, an annular static sealing surface in sealing engagement with said seal groove, and an annular dynamic sealing lip in sealing engagement with said second machine component and deformed against said relatively rotatable surface and establishing an interfacial contact footprint therebetween;
said contact footprint having a circular footprint edge and a wavy footprint edge including at least one wave having a wave height, said contact footprint having a minimum footprint width and a maximum footprint width between said circular footprint edge and said wavy footprint edge, a swept zone being defined by the portion of said contact footprint circumferentially aligned with the wave height and an unswept zone being defined by the portion of said contact footprint circumferentially aligned with said minimum footprint width,
said dynamic sealing lip comprising an annular dynamic sealing surface located between said first and second body ends, a sloping inlet surface located between said first body end and at least a portion of said dynamic sealing surface, and a lubricant side flank located between said first body end and at least a portion of said sloping inlet surface, said sloping inlet surface having a convex profile when viewed in longitudinal cross-section and forming a smooth blended transition with at least part of said dynamic sealing surface, at least part of said sloping inlet surface being skewed with respect to the direction of relative rotation and forming part of a hydrodynamic inlet introducing a lubricant into said interfacial contact footprint in response to relative rotation,
said dynamic sealing lip having a circular exclusion edge,
a ridge flank bounded by a ridge flank boundary, at least a first portion of said ridge flank boundary comprising a first ridge portion at an intersection of said ridge flank and said sloping inlet surface, at least a second portion of said ridge flank boundary comprising a second ridge portion at an intersection of said ridge flank and said dynamic sealing surface, said first ridge portion defining an external corner when viewed in longitudinal cross-section and said second ridge portion defining an external corner when viewed in longitudinal cross-section, said ridge flank truncating at least a portion of said sloping inlet surface and at least a portion of said dynamic sealing surface,
a ridge comprising said first and second ridge portions, said ridge producing a diverting pressure ridge within said interfacial contact footprint and diverting at least a portion of the lubricant from said swept zone into said unswept zone and toward said exclusion edge during relative rotation between said relatively rotatable surface and said hydrodynamic seal, at least a portion of said diverting pressure ridge being located in said swept zone and skewed with respect to said direction of relative rotation,
said ridge being curved with respect to the direction of relative rotation so that some of said ridge is farther from said exclusion edge compared to a part of said ridge which is closer to said exclusion edge, there being an axial separating distance between said ridge and said exclusion edge, at least a portion of said dynamic sealing surface being located between said sloping inlet surface and said second body end and being located between said lubricant side flank and said second body end.

37. The hydrodynamic sealing assembly of claim 36, wherein said seal groove of said first machine component comprises first and second walls in opposing relationship and said hydrodynamic seal concurrently contacts said first and second walls.

38. The hydrodynamic sealing assembly of claim 36, wherein said ridge flank is located between said lubricant side flank and said dynamic sealing surface.

39. The hydrodynamic sealing assembly of claim 36, wherein said ridge flank is located between and adjoining said lubricant side flank and said dynamic sealing surface.

40. A hydrodynamic rotary seal for location by a machine component for dynamic sealing engagement with a relatively rotatable surface having a direction of relative rotation with respect to the rotary seal, and for serving as a partition between a first fluid of a lubricant supply and a second fluid, comprising:
an annular static sealing surface forming a sealing interface with the machine component;
a generally circular dynamic lip having a generally circular exclusion edge, at least a portion of said dynamic lip maintained in a compressed, contacting relation with the relatively rotatable surface to define an interfacial contact footprint between said dynamic lip and the relatively rotatable surface, a first footprint edge of said interfacial contact footprint being wavy, and a second footprint edge being generally circular, said first footprint edge having at least one wave having a wave height, said interfacial contact footprint having a minimum footprint width and a maximum footprint width between said first and second footprint edges, a swept zone being defined by the portion of said contact footprint circumferentially aligned with said wave height and an unswept zone being defined by the portion of said contact footprint circumferentially aligned with said minimum footprint width, said at least one wave having a wave leading edge and a wave trailing edge relative to said direction of relative rotation, said wave leading and trailing edges having skew relative to said direction of relative rotation, said skew of said leading edge being generally opposite said skew of said trailing edge, wherein during relative rotation between said dynamic lip and the relatively rotatable surface, said interfacial contact footprint is a dynamic sealing interface with sliding occurring between said dynamic lip and the relatively rotatable surface, and in the absence of relative rotation, said interfacial contact footprint is a static sealing interface;

said dynamic lip comprising:
- an annular dynamic sealing surface contacting the relatively rotatable surface;
- a lubricant side flank facing the first fluid, at least part of said lubricant side flank being wavy, at least a portion of said dynamic sealing surface being located in intermediate relation to said lubricant side flank and said exclusion edge;
- a sloping inlet surface having a convex profile when viewed in longitudinal cross-section and blending at least a portion of said lubricant side flank to at least a portion of said dynamic sealing surface, at least a portion of said sloping inlet surface being skewed with respect to the direction of relative rotation and forming part of a hydrodynamic inlet for the first fluid, at least a portion of said dynamic sealing surface being located between said sloping inlet surface and said exclusion edge;
- a ridge flank bounded by a boundary, a first portion of said boundary at an intersection of said ridge flank with at least a portion of said sloping inlet surface producing an external corner, a second portion of said boundary at an intersection of said ridge flank and at least a portion of said dynamic sealing surface producing an external corner, a third portion of said boundary at an intersection of said ridge flank and at least a portion of said lubricant side flank producing an external corner, said at least a portion of said sloping inlet surface and said at least a portion of said dynamic sealing surface being truncated by said ridge flank, a ridge comprising said first and second portions of said boundary, each said external corner of said first and second portions of said boundary having a convex shape when viewed in longitudinal cross-section;
- at least part of said ridge being curved in a circumferential direction so that some of said ridge is farther from said exclusion edge compared to a part of said ridge which is closer to said exclusion edge, there being an axial separating distance between said ridge and said exclusion edge;
- said ridge having a ridge leading edge and a ridge trailing edge relative to said direction of relative rotation, said ridge leading edge being skewed relative to said direction of relative rotation and being skewed generally oppositely to said skew of said wave leading edge, at least a portion of said ridge being located in said swept zone and producing a diverting pressure ridge in said swept zone.

41. The hydrodynamic rotary seal of claim 40, wherein said ridge flank is located between said lubricant side flank and said dynamic sealing surface.

42. The hydrodynamic rotary seal of claim 40, wherein said ridge flank is located between and adjoining said lubricant side flank and said dynamic sealing surface.

43. The hydrodynamic rotary seal of claim 40, wherein said ridge flank producing a visual appearance of cutting away a portion of said sloping inlet surface and a portion of said dynamic surface.

44. The hydrodynamic rotary seal of claim 40, wherein said ridge flank has a visual appearance, said visual appearance being that of cutting away a portion of said sloping inlet surface and a portion of said dynamic surface.

45. The hydrodynamic rotary seal of claim 40, wherein at least a portion of said ridge flank is recessed relative to said sloping inlet surface and relative to said dynamic surface.

46. The hydrodynamic rotary seal of claim 40, wherein said dynamic lip having a visual appearance, said visual appearance being that said sloping inlet surface and said dynamic surface have a portion cut away by said ridge flank.

47. A hydrodynamic seal comprising:
- an annular seal body having first and second body ends, an annular static sealing surface and an annular dynamic sealing lip, said dynamic sealing lip including a lubricant side flank and a dynamic sealing surface adjoining a sloping inlet surface having a convex profile when viewed in longitudinal cross-section, said sloping inlet surface having a leading edge and a trailing edge, said leading edge of said sloping inlet surface having skew relative to said second body end;
- wherein at least a portion of said dynamic sealing lip defines a ridge flank surrounded by a boundary, at least a portion of said ridge flank boundary comprising a ridge at an intersection of said ridge flank and said sloping inlet surface, said ridge defining an external corner, said ridge having a leading edge and a trailing edge, said leading edge of said ridge having skew relative to said second body end, said skew of said leading edge of said ridge being generally opposite said skew of said leading edge of said sloping inlet surface;
- at least part of said ridge leading edge having the shape of an external corner when viewed in longitudinal cross-section,
- at least a portion of said ridge flank recessed relative to said sloping inlet surface, said at least a portion of said ridge flank intersecting said lubricant side flank at a second portion of said ridge flank boundary, at least part of said second portion of said ridge flank boundary defining an external corner;
- at least a portion of said sloping inlet surface being truncated by said ridge flank and said ridge;
- at least part of said ridge being curved so that some of said ridge is farther from said second body end compared to a part of said ridge which is closer to said second body end, there being a separating distance between said ridge and said second body end.

48. The hydrodynamic seal of claim 47, wherein said sloping inlet surface having a smooth blended transition with said dynamic sealing surface and with said lubricant side flank.

49. The hydrodynamic seal of claim 47, wherein at least a portion of said ridge is rounded and varies in curvature along at least part of the length thereof.

50. The hydrodynamic seal of claim 47, wherein said ridge interrupts said dynamic sealing surface.

51. The hydrodynamic seal of claim 47, wherein said ridge is defined by a sharp intersection.

52. The hydrodynamic seal of claim 47, wherein said ridge is defined by a rounded intersection.

53. The hydrodynamic seal of claim 47, wherein said seal body includes a flexible transitional heel located between said dynamic sealing surface and said second end of said seal body and sloped with respect to said dynamic sealing surface and said second end of said seal body, and said dynamic sealing surface terminating at said flexible transitional heel, an intersection between said dynamic sealing surface and said flexible transitional heel forming an abrupt exclusion edge of generally circular form.

54. The hydrodynamic seal of claim 53, wherein a heel transition is located between said flexible transitional heel and said second end of said seal body, and said heel transition is rounded when viewed in longitudinal cross-section.

55. The hydrodynamic seal of claim 53, wherein said ridge flank is shaped so that the distance between said ridge and said exclusion edge varies circumferentially, said ridge having a central portion and two end portions with said central portion located closer to said exclusion edge than said two end portions.

56. The hydrodynamic seal of claim 53, wherein the abruptness of said ridge varies as a function of its distance from said exclusion edge with the abruptness decreasing as said ridge nears said exclusion edge.

57. The hydrodynamic seal of claim 47, wherein said seal body includes an exclusion edge formed by an intersection between an end of said dynamic sealing surface and said second end of said seal body.

58. The hydrodynamic seal of claim 47, wherein said lubricant side flank is wavy and varies in slope around the circumference of said seal body.

59. The hydrodynamic seal of claim 47, wherein at least a portion of said sloping inlet surface is wavy in a radial and axial direction.

60. The hydrodynamic seal of claim 47, configured for use within a machine assembly, said machine assembly comprising:
    a first machine component defining a seal groove; and
    a second machine component having a relatively rotatable surface;
    wherein said seal body is in sealing engagement with said first and second machine components.

61. The hydrodynamic rotary seal of claim 47, wherein said ridge flank is located between said lubricant side flank and said dynamic sealing surface.

62. The hydrodynamic rotary seal of claim 47, wherein said ridge flank is located between and adjoining said lubricant side flank and said dynamic sealing surface.

63. The hydrodynamic rotary seal of claim 47, wherein said ridge flank producing a visual appearance of cutting away a portion of said sloping inlet surface.

64. The hydrodynamic rotary seal of claim 47, wherein said ridge flank has a visual appearance, said visual appearance being that of cutting away a portion of said sloping inlet surface.

65. The hydrodynamic rotary seal of claim 47, wherein said dynamic lip has a visual appearance, said visual appearance being that said sloping inlet surface has a portion cut away by said ridge flank.

66. The hydrodynamic rotary seal of claim 47, wherein said ridge flank is a peripheral shape tapering to a point at each end in a circumferential direction.

67. The hydrodynamic rotary seal of claim 47, wherein said ridge flank is a peripheral shape with first and second circumferential extremities, and tapers to a point at each of said first and second circumferential extremities.

68. The hydrodynamic rotary seal of claim 47, wherein said ridge flank has a circumferentially elongated peripheral shape having first and second circumferential extremities, and tapers to a first circumferentially oriented point at said first circumferential extremity and tapers to a second circumferentially oriented point at said second circumferential extremity, said first circumferentially oriented point facing in a generally opposite direction from said second circumferentially oriented point.

69. The hydrodynamic rotary seal of claim 47, wherein said ridge flank having an oval shape with first and second circumferential extremities, and tapers to a first circumferentially oriented point at said first circumferential extremity.

70. A hydrodynamic sealing assembly comprising:
    a first machine component defining a seal groove;
    a second machine component having a relatively rotatable surface; and
    a hydrodynamic seal in sealing engagement with said first and second machine components, said hydrodynamic seal comprising:
        an annular seal body having first and second body ends and a dynamic sealing lip, said dynamic sealing lip including an annular dynamic sealing surface adjoining a sloping inlet surface, said sloping inlet surface having a convex profile when viewed in longitudinal cross-section and providing a smooth blended transition to at least part of said dynamic sealing surface, and said dynamic sealing surface contacting said relatively rotatable surface;
        said sloping inlet surface having a leading edge and a trailing edge, said leading and trailing edges of said sloping inlet surface having skew relative to said second body end, said skew of said leading edge of said sloping inlet surface being generally opposite said skew of said trailing edge of said sloping inlet surface;
        said dynamic sealing lip including a ridge flank defining a ridge in the form of an external corner, said ridge serving as a bi-directional diverter, at least a first portion of said ridge in the form of an external corner at an intersection of said ridge flank and said dynamic sealing surface and at least a second portion of said ridge in the form of an external corner at an intersection of said ridge flank and said sloping inlet surface;
        said ridge having a leading edge and a trailing edge, said leading and trailing edges of said ridge having skew relative to said second body end, said skew of said leading edge of said ridge being generally opposite said skew of said leading edge of said sloping inlet surface;
        at least a portion of said sloping inlet surface being truncated by said ridge flank and said ridge;
        at least part of said ridge being curved, causing parts of said ridge to be farther from the second body end, compared to a part of said ridge which is closest to said second body end but separated from said second body end by a separating distance.

71. The hydrodynamic sealing assembly of claim 70, wherein said sloping inlet surface forms at least a part of a hydrodynamic inlet when said dynamic sealing lip contacts said relatively rotatable surface.

72. The hydrodynamic sealing assembly of claim 70, wherein said seal body is positioned substantially inside said seal groove.

73. The hydrodynamic sealing assembly of claim 70, wherein said seal groove of said first machine component is formed by first and second walls in opposing spaced relationship and said hydrodynamic seal concurrently contacts said first and second walls.

74. The hydrodynamic sealing assembly of claim 70, wherein said ridge flank producing a visual appearance of cutting away a portion of said sloping inlet surface.

75. The hydrodynamic sealing assembly of claim 70, wherein said ridge flank has a visual appearance, said visual appearance being that of cutting away a portion of said sloping inlet surface.

76. The hydrodynamic sealing assembly of claim 70, wherein at least a portion of said ridge flank is recessed relative to said sloping inlet surface.

77. The hydrodynamic sealing assembly of claim 70, wherein said dynamic lip has a visual appearance, said visual appearance being that said sloping inlet surface has a portion cut away by said ridge flank.

78. A hydrodynamic rotary seal comprising:
an annular member having first and second ends generally facing in opposite axial directions and inner and outer surfaces generally facing opposite radial directions;
said inner surface comprising:
a wavy lubricant side flank located in intermediate relation to said member first and second ends and located spatially from said member second end, at least a portion of said lubricant side flank skewed relative to said member second end;
a generally inwardly-facing annular dynamic sealing surface located in intermediate relation to said lubricant side flank and said member second end and terminating at an abrupt exclusion edge of generally circular form that is located spatially from said member first end and proximate said member second end, said dynamic sealing surface being radially inward of said lubricant side flank;
a sloping inlet surface adapted for forming part of a hydrodynamic inlet upon installation of the rotary seal, said sloping inlet surface located between at least part of said lubricant side flank and at least part of said dynamic sealing surface, when viewed in longitudinal cross-section said sloping inlet surface has a convex curved form providing a smooth blended axial transition with said lubricant side flank and a smooth blended axial transition with said dynamic sealing surface, said sloping inlet surface having leading and trailing edges, at least a portion of said leading edge of said sloping inlet surface having skew with respect to said abrupt exclusion edge;
a ridge flank located in intermediate relation to said member first end and said abrupt exclusion edge and located spatially from said abrupt exclusion edge, said ridge flank bounded by a peripheral boundary, at least a first portion of said ridge flank peripheral boundary defined at an intersection of said ridge flank with said sloping inlet surface, at least a second portion of said ridge flank peripheral boundary defined at an intersection of said ridge flank with said lubricant side flank, said at least a second portion of said ridge flank peripheral boundary comprising an external corner when viewed in longitudinal cross-section, and at least a third portion of said ridge flank peripheral boundary defined by a ridge formed at an intersection of said ridge flank with said dynamic sealing surface, said ridge defining an external corner and defining the most radially inward portion of said ridge flank when viewed in longitudinal cross-section, said ridge having leading and trailing edges, said leading edge of said ridge having skew with respect to said abrupt exclusion edge and with respect to said leading edge of said sloping inlet surface, said skew of said leading edge of said ridge being generally opposite said skew of said leading edge of said sloping inlet surface.

79. The hydrodynamic rotary seal of claim 78, wherein said ridge flank has a straight profile when viewed in longitudinal cross-section.

80. The hydrodynamic rotary seal of claim 78, wherein said ridge flank is angled relative to said dynamic sealing surface.

81. The hydrodynamic rotary seal of claim 78, wherein said ridge is nearer said exclusion edge than a remaining portion of said ridge flank when viewed in longitudinal cross-section.

82. The hydrodynamic rotary seal of claim 78, wherein said ridge flank is a peripheral shape tapering to a point at each end in a circumferential direction.

83. The hydrodynamic rotary seal of claim 78, wherein at least a portion of said ridge flank is radially outward of said sloping inlet surface.

84. The hydrodynamic rotary seal of claim 83, wherein at least a portion of said sloping inlet surface is radially outward of said ridge flank.

85. The hydrodynamic rotary seal of claim 78, wherein at least a portion of said ridge is axially located between said sloping inlet surface and said abrupt exclusion edge.

86. The hydrodynamic rotary seal of claim 78, wherein at least a portion of said ridge is axially located between said lubricant side flank and said dynamic sealing surface.

87. A ring-shaped hydrodynamic seal having a seal body of generally circular configuration and having a dynamic sealing lip of generally annular form that projects from the seal body, the seal body having a first body end and a second body end, the first body end located in generally opposed relation to the second body end, the dynamic sealing lip incorporating a dynamic sealing surface and having a lubricant side flank that is non-circular and wavy, the dynamic sealing lip having a widest part and narrower portions, the narrower portions of the dynamic sealing lip having a sloping inlet surface that is skewed with respect to a direction of relative rotation, at least part of the lubricant side flank being blended to the dynamic sealing surface by the sloping inlet surface, the dynamic sealing lip having an exclusion edge with an abrupt, circular form, the lubricant side flank located in spaced relation with respect to the exclusion edge and the second body end, wherein the improvement comprises:
the dynamic sealing lip including a ridge flank having a boundary, at least a first portion of said ridge flank boundary at an intersection of said ridge flank and the sloping inlet surface and at least a second portion of said ridge flank boundary at an intersection of said ridge flank and the dynamic sealing surface, said at least the first portion of said ridge flank boundary comprising a first ridge portion in the form of an external corner and said at least the second portion of said ridge flank boundary comprising a second ridge portion in the form of an external corner, said first ridge portion and said ridge flank truncating at least part of the sloping inlet surface and said second ridge portion and said ridge flank truncating at least part of the dynamic sealing surface, thereby making the sloping inlet surface look as if a portion has been cut away, and thereby making the dynamic sealing surface look as if a portion has been cut away, a ridge comprising said first and second ridge portions, at least part of said ridge being curved so that some of said ridge is closer to the exclusion edge and some of said ridge is farther away from the exclusion edge.

88. The ring-shaped hydrodynamic seal of claim 87, wherein the sloping inlet surface is curved when viewed in longitudinal cross-section.

89. The ring-shaped hydrodynamic seal of claim 87, wherein said ridge and said ridge flank truncate at least a portion of the lubricant side flank, making the lubricant side flank look as if a portion has been cut away.

90. The ring-shaped hydrodynamic seal of claim 87, wherein said first ridge portion is sharp when viewed in longitudinal cross-section.

91. The ring-shaped hydrodynamic seal of claim 87, wherein said first ridge portion is rounded when viewed in longitudinal cross-section.

92. The ring-shaped hydrodynamic seal of claim 87, wherein said first ridge portion is rounded when viewed in longitudinal cross-section, and has a degree of abruptness that decreases as said first ridge portion comes closer to the exclusion edge.

93. The ring-shaped hydrodynamic seal of claim 87, wherein said ridge flank bifurcates the sloping inlet surface.

94. The ring-shaped hydrodynamic seal of claim 87, wherein an angle B is an included angle between the dynamic sealing surface and said ridge flank, and said angle B is greater than 90 degrees.

95. The ring-shaped hydrodynamic seal of claim 94, wherein said included angle B increases as said first ridge portion comes closer to the exclusion edge.

96. The ring-shaped hydrodynamic seal of claim 87, wherein said first ridge portion is rounded when viewed in longitudinal cross-section, having a local curvature that becomes larger as said first ridge portion comes closer to the exclusion edge.

97. The ring-shaped hydrodynamic seal of claim 87, wherein said first ridge portion has a length, and said first ridge portion is abrupt in an axial direction and becomes less abrupt along said length of said first ridge portion as said first ridge portion comes closer to the exclusion edge.

98. The ring-shaped hydrodynamic seal of claim 87, wherein said first ridge portion is abrupt with local curvature in an axial direction that varies in curvature as said first ridge portion comes closer to the exclusion edge.

99. The ring-shaped hydrodynamic seal of claim 87, wherein when viewed in longitudinal cross-section said ridge flank is substantially straight.

100. The ring-shaped hydrodynamic seal of claim 87, wherein said first ridge portion has a length in a circumferential direction, at least part of said first ridge portion is curved when viewed in longitudinal cross-section, and varies in axial position relative to the exclusion edge along said length of said first ridge portion.

101. The ring-shaped hydrodynamic seal of claim 87, wherein said ridge flank has a circumferentially elongated peripheral shape having first and second circumferential extremities, and tapers to a first circumferentially oriented point at said first circumferential extremity and tapers to a second circumferentially oriented point at said second circumferential extremity, said first circumferentially oriented point facing in a generally opposite direction from said second circumferentially oriented point.

102. The ring-shaped hydrodynamic seal of claim 87, wherein said ridge flank having an oval shape with first and second circumferential extremities, and tapers to a first circumferentially oriented point at said first circumferential extremity.

103. The ring-shaped hydrodynamic seal of claim 87, wherein said ridge flank has peripheral shape that tapers to a point in a circumferential direction.

104. A ring-shaped hydrodynamic seal having a seal body of generally circular configuration and having a dynamic sealing lip of generally annular form that projects from the seal body, the seal body having a first body end and a second body end, the first body end located in generally opposed relation to the second body end, the dynamic sealing lip incorporating a dynamic sealing surface and having a lubricant side flank that is non-circular and wavy, the dynamic sealing lip having a widest part and first and second narrower portions, each of the first and second narrower portions of the dynamic sealing lip having a sloping inlet surface that is skewed with respect to a direction of relative rotation, at least part of the lubricant side flank being blended to the dynamic sealing surface by the sloping inlet surface, the dynamic sealing lip having an exclusion edge with an abrupt circular form, the lubricant side flank located in spaced relation with respect to the exclusion edge and the second body end, wherein the improvement comprises:

a ridge flank bounded by a boundary, said ridge flank located circumferentially between the first and second narrower portions of the dynamic sealing lip, and located axially between the dynamic sealing surface and the lubricant side flank, a first portion of said boundary at an intersection of said ridge flank and the dynamic sealing surface producing an external corner, a second portion of said boundary at an intersection of said ridge flank and the first sloping inlet surface producing an external corner, a third portion of said boundary at an intersection of said ridge flank and the second sloping inlet surface producing an external corner, and a fourth portion of said boundary at an intersection of said ridge flank and the lubricant side flank producing an external corner.

105. The ring-shaped hydrodynamic seal of claim 104, wherein said external corner is a rounded corner.

* * * * *